United States Patent
Diosi et al.

(10) Patent No.: US 7,803,082 B2
(45) Date of Patent: Sep. 28, 2010

(54) MULTI-STEP TRANSMISSION

(75) Inventors: Gabor Diosi, Friedrichshafen (DE); Josef Haupt, Tettnang (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 617 days.

(21) Appl. No.: 11/817,058

(22) PCT Filed: Mar. 15, 2006

(86) PCT No.: PCT/EP2006/002381

§ 371 (c)(1),
(2), (4) Date: Aug. 24, 2007

(87) PCT Pub. No.: WO2006/099981

PCT Pub. Date: Sep. 28, 2006

(65) Prior Publication Data

US 2008/0153653 A1     Jun. 26, 2008

(30) Foreign Application Priority Data

Mar. 23, 2005   (DE) ................ 10 2005 013 382

(51) Int. Cl.
*F16H 3/62* (2006.01)
(52) U.S. Cl. ...................................... 475/275
(58) Field of Classification Search ......... 475/275–278, 475/284
See application file for complete search history.

(56) References Cited

U.S. PATENT DOCUMENTS

| | | | |
|---|---|---|---|
| 3,971,268 A | * | 7/1976 | Murakami et al. .......... 475/276 |
| 4,038,888 A | * | 8/1977 | Murakami et al. .......... 475/276 |
| 4,224,838 A | | 9/1980 | Roushdy et al. |
| 4,624,154 A | * | 11/1986 | Kraft et al. .................. 475/66 |
| 5,429,557 A | | 7/1995 | Beim |
| 6,176,803 B1 | | 1/2001 | Meyer et al. |
| 6,558,287 B2 | | 5/2003 | Hayabuchi et al. |
| 6,634,980 B1 | * | 10/2003 | Ziemer ...................... 475/275 |
| 6,960,149 B2 | | 11/2005 | Ziemer |
| 7,014,589 B2 | | 3/2006 | Stevenson |
| 7,018,319 B2 | | 3/2006 | Ziemer |

(Continued)

FOREIGN PATENT DOCUMENTS

DE          42 34 572 A1     4/1994

(Continued)

*Primary Examiner*—Ha D. Ho
(74) *Attorney, Agent, or Firm*—Davis & Bujold, P.L.L.C.

(57) ABSTRACT

A transmission including an input and output shafts, gearsets (RS1-RS4), shafts (1-8) and elements (A-E). Carriers respectively of gearsets (RS4, RS3) and the input and output shafts respectively form shafts (1, 2), sun gears of gearsets (RS1, RS4) form shaft (3). A ring gear and carrier respectively of gearsets (RS1, RS2) form shafts (4, 8). A ring and sun gear respectively of gearsets (RS2, RS3) form shaft (5), a carrier a ring gear respectively of gearsets (RS1, RS3) form shaft (6), a sun gear of gearset (RS2) and a ring gear of gearset (RS4) form shaft (7). In the power flow, elements (A, B) are respectively between shafts (3, 4) and the housing; element (C) between shafts (5, 1), element (D) between shafts (8, 2) or (8, 6); element (E) between two of shafts (5, 7, 8). Gearsets (RS2, RS4) are axially and radially aligned between gearsets (RS1, RS3).

46 Claims, 13 Drawing Sheets

U.S. PATENT DOCUMENTS 7,118,509 B2 * 10/2006 Tabata et al. .............. 475/276
2004/0242368 A1 12/2004 Tabata et al.

FOREIGN PATENT DOCUMENTS

| DE | 199 49 507 | A1 | 4/2001 |
| DE | 100 83 202 | T1 | 1/2002 |
| DE | 101 15 983 | A1 | 10/2002 |
| DE | 101 15 995 | A1 | 10/2002 |
| DE | 102 13 820 | A1 | 10/2002 |
| DE | 10 2004 029 952 | A1 | 1/2005 |
| DE | 10 2005 002 337 | A1 | 8/2006 |
| EP | 1 398 537 | A2 | 3/2004 |

* cited by examiner

| Gear | Engaged Shifting Elements | | | | | Ratio i | Step φ |
|---|---|---|---|---|---|---|---|
| | Brake | | Clutch | | | | |
| | A | B | C | D | E | | |
| 1 | ● | ● | ● | | | 4.700 | |
| 2 | ● | ● | | | ● | 3.133 | 1.500 |
| 3 | | ● | ● | | ● | 2.143 | 1.462 |
| 4 | | ● | | ● | ● | 1.700 | 1.260 |
| 5 | | ● | ● | ● | | 1.298 | 1.309 |
| 6 | | | ● | ● | ● | 1.000 | 1.298 |
| 7 | ● | | ● | ● | | 0.839 | 1.192 |
| 8 | ● | | | ● | ● | 0.667 | 1.258 |
| R | ● | ● | | ● | | -3.280 | TOTAL 7.05 |

Fig. 7

MULTI-STEP TRANSMISSION

This application is a national stage completion of PCT/EP2006/002381 filed Mar. 15, 2006, which claims priority from German Application Serial No. 10 2005 013 382.7 filed Mar. 23, 2005.

FIELD OF THE INVENTION

The present invention concerns a multi-speed transmission, constructed on the principal of planetary gears, in particular, being an automatic transmission for a motor vehicle.

BACKGROUND OF THE INVENTION

Automatic transmissions, especially for motor vehicles, encompass, in accordance with the state of the technology, have planetary gearsets which, with the aid of frictionally based shifting elements, such as clutches and brakes, can be engaged. Transmissions normally possesses a slip-action startup element and are optionally furnished with a bypass clutch. The bypass clutch would be supplied, for instance, in the form of a hydrodynamic torque converter or a hydrodynamic clutch.

A multi-speed transmission of this generic type is disclosed by DE 102 13 820 A1. This cited transmission includes one input shaft and one output shaft, which are mutually co-axially aligned. Further included is a total of three planetary gearsets and six frictional-based shifting elements. For the transfer of the speed of rotation of the input shaft to the output shaft, the cited transmission provides two power paths. Two of the planetary gearsets form a shiftable principal gearset which is designed as a two-carrier, four shaft transmission and is further known as a Ravigneaux planetary gearset or, alternately as a Simpson planetary gearset. The output element of the principal gearset is connected to the output shaft of the transmission. The remainder of the three planetary gearsets serve as simple planetary gearsets and form non-shiftable, input-sided gearsets, which are rigidly connected to the input shaft and generate on the output end, two speeds of rotation where, first, the speed of rotation of the input shaft, second, the torque can also be transmitted to various input elements of the principal gearset. By selective engagement of two of the six frictional shifting elements, which are namely clutches and brakes, a total of eight forward gearsets can be engaged without range shifting. In this way, when changing from one gearset into the next higher or the next lower gear, only one of the previously engaged shifting elements need be disengaged and one previously disengaged shifting element needs to be engaged.

Made known by U.S. Pat. No. 5,429,557, is an axially aligned, comparatively compactly assembled multi-speed automatic transmission with an input-sided gear group and an extended, principal planetary gearset constructed of two planetary gearsets, which are coupled together as in a two-carrier, four shaft planetary transmission. In an embodiment of this transmission, which serves well for installation in a vehicle having a front-end, transversely directed drive, the input shaft and the output shaft are arranged to be axis-parallel to one another. Starting with this arrangement, the input-sided gear group is constructed in the input-sided method for overdrive characteristics, with two spur gearsets of a constant ratio and the two planetary gearsets of the principal gearset are radially intermeshing, one within the other, wherein the axes thereof run parallel to the axis of the input shaft of the likewise transverse transmission. With a total of five frictionally based shifting elements, as recited in the known patent, only six forward, gears are operationally available without range shifting.

Furthermore, DE 199 49 507 A1 of the Applicant, discloses a multi-speed transmission with two non-shiftable, input-sided planetary gearsets placed on the input shaft, that generate two speeds of rotation which, together with the speed of rotation of the input shaft, can be transmitted to various input elements of a multi-speed principal planetary gearset by way of selective engagement of shifting elements acting upon the output shaft AB such that when changing from one gearset to the next higher or the next lower gearset, only one engaged shift element need be disengaged. The principal planetary gearset, as before, is once again constructed in the manner of a double planetary gearset as employed in a two-carrier, four shaft planetary gearset, wherein the two double planetary gearsets are rigidly coupled to one another. Such that when five shifting elements are used, seven forward gearsets can be implemented without range shifting. With the use of six shifting elements, nine or ten forward gearsets become available. All four planetary gearsets are, in this embodiment, co-axially aligned to each other and to the input shaft.

Within the framework of DE 101 15 983 A1 of the Applicant, a multi-speed transmission is described and comprises one drive shaft, which is connected with an input-sided gear group, and one output shaft which, in turn, is connected to an output sided gear group and further has a maximum of seven shifting elements, the selective engagement of which implements at least eight forward gearsets (without range shifting). The input-sided gear group is a shiftable or a non-shiftable planetary gearset or, alternately, a pair of non-shiftable, mutually coupled planetary gearsets. The output-sided planetary gear group is assembled as a two-carrier, four shaft transmission with two shiftable output-sided planetary gearsets and possesses four free shafts. The first free shaft of this two-carrier, four shaft transmission is connected with the first shifting element; the second free shaft is connected to the second and third shifting element; the third free shaft is attached to the fourth and fifth shifting element, and the fourth free shaft is connected to the output shaft. In a multi-speed transmission with a total of six shifting elements, it is proposed to additionally connect the third free shaft or the first free shaft of the output-sided gear group additionally to the sixth shifting element. For a multi-speed transmission having a total of seven shifting elements, it is proposed to also connect the third free shaft with the sixth shifting element and the first free shaft to a seventh shifting element. In these known embodiments, all planetary gearsets of the transmission are mutually co-axial.

A plurality of other multi-speed transmissions are disclosed by DE 101 15 995 A1 of the Applicant, wherein four shiftable, mutually coupled and co-axially arranged planetary gearsets and six or seven frictionally based shifting elements are provided the selective shifting of which transmits a speed of rotation of an input shaft of the transmission to an output shaft of the transmission, such that nine or eleven forward gearsets and at least one reverse gearset become available. According to the shifting diagram of the transmission, it may be seen that in each gearset two or three shifting elements are engaged while, upon a change from one gearset to the next successive higher or lower gearset, only one engaged shifting element need be disengaged and one previously engaged element need be engaged, while avoiding range shifting.

The present invention has the purpose of proposing a multi-speed transmission of the generic kind mentioned in the opening lines, which possesses at least eight forward gearsets and at least one reverse gearset and with the use of a total of four planetary gearsets, the least possible number of shifting elements need be included. In this arrangement, all four forward gearsets, when in a sequential gear change, can be so shifted without range shifting, in other words, in a case of change from one forward gearset to the successively next higher or lower forward gearset, respectively, only one previously engaged shifting element need be disengaged and a previously engaged shifting element need be disengaged. In addition, the transmission is expected to exhibit a large spread, where comparative harmonic gear separations are concerned and have a favorable degree of efficiency in the principal gearsets used mainly in driving. This means a comparatively small amount of slippage and tooth wear is incurred. The transmission should be adaptable, in particular, for usage with non co-axial input and output shafts and correspondingly, the axial length of the transmission should be held to the shortest possible dimensioning.

SUMMARY OF THE INVENTION

According to the above, a multi-speed transmission is proposed, which possesses one input shaft, one output shaft, four planetary gearsets, at least eight rotatable shafts, as well as five shifting elements—the latter comprising two brakes and three clutches. The shifting elements are so designed that their selective engagement implements predetermined different rotational speed ratios, between the input shaft and the output shaft, with the result that eight forward gearsets and one reverse gearset can be realized.

In this arrangement, a carrier of the fourth planetary gearset and the input shaft are mutually connected and form the first rotatable shaft of the transmission. A carrier of the third planetary gearset and the output shaft are connected together to form the second rotatable shaft of the transmission where, between this carrier of the third planetary gearset and the output shaft, a sprocket or chain drive and a differential can be kinematically inserted. A sun gear of the first planetary gearset and a sun gear of the fourth planetary gearset are rotationally affixed to one another and form the third rotational shaft of the transmission. A ring gear of the first planetary gearset forms the fourth rotational shaft of the transmission. A ring gear of the second planetary gearset and a sun gear of the third planetary gearset are, likewise, rotationally connected together and form the fifth rotational shaft of the transmission. A carrier of the first planetary gearset and a ring gear of the third planetary gearset are rotatably affixed to one another and form the sixth rotational shaft of the transmission. A sun gear of the second planetary gearset and a ring gear of the fourth planetary gearset are rotationally affixed to one another and form the seventh rotational shaft of the transmission. A carrier of the second planetary gearset forms the eighth rotational shaft of the transmission.

In regard to the connection of the five shifting elements to the varied elements of the planetary gearsets and to the input shaft of the transmission, provision has been made that the first shifting element is placed in the power flow between the third shaft and a housing of the transmission; the second shifting element is placed in the power flow, between the fourth shaft and the housing of the transmission, and the third shifting element is placed in the power flow, between the fifth and the first shafts. Further, in this respect, the fourth shifting element is placed either between the eighth and the second shafts or, otherwise, between the eighth and the sixth shafts. The fifth shifting element is intended for the locking of the second planetary gearset and is accordingly placed in the power flow either between the seventh and the fifth shafts or between the seventh and the eighth shafts. By way of these varied kinematic couplings of the shifting elements to the various shafts of the transmission, they form an entire transmission family.

A stated desired gearset is cited below with the necessary actions for its achievement: the first forward gearset is defined by the engagement of the first, second and third shifting elements; the second forward gearset is achieved by the engagement of the first, second and fifth shifting elements; the third forward gearset is reached by the engagement of the second, third and fifth shifting elements; the fourth forward gearset is achieved by the engagement of the second, third and fifth shifting elements; the fourth forward gearset is achieved by the engagement of second, fourth and fifth shifting elements, the fifth forward gearset is reached by the engagement of the second, third and fourth shifting elements; the sixth forward gearset is achieved by the engagement of the third, fourth and fifth shifting elements; the seventh forward gearset is reached by the engagement of the first, third and fourth shifting elements; the seventh forward gearset is reached by the engagement of the first, third and fourth shifting elements and the eighth forward gearset is achieved by the engagement of the first, fourth, and fifth shifting elements. A reverse gearset is achieved by the engagement of the first, second and fourth shifting elements.

The immediately above gearset scheme is an object of the unpublished patent application DE 10 2005 002 337.1 of the Applicant. On this account, the descriptive content of DE 10 2005 002 337.1 is incorporated by reference.

According to the invention, in regard to the spatial arrangement of the four planetary gearsets within the transmission, provision has been made that the second and the fourth planetary gearsets, when observed in an axial direction, are placed in a plane, radially located above one another, i.e., they are radially intermeshing, one interposed within the other. The fourth planetary gearset is placed centrally within the second planetary gearset, whereby the ring gear of the (radially inner) fourth planetary gearset simultaneously forms the sun gear of the (radially outer) second planetary gearset. Further, according to the invention, it may be seen than these two radially intermeshing planetary gearsets, with respect to their spatial requirements, are axially located between the other two planetary gearsets.

All four planetary gearsets are advantageously constructed as the negative-planetary gearsets, the planetary gears of which mesh with the sun gear and with the ring gear of the respective planetary gearset. The inventive kinematic coupling of the gearset elements, shifting elements, input shaft and output shaft, favorable gearset shifting is created by a special combination of the stationary transmission ratios of the individual planetary gearsets. Primarily for the reason that, in the present case, the stationary ratio for the second planetary gearset, from an operational standpoint, does approach a relatively small value and simultaneously the stationary ratio of the fourth planetary gearset, on like basis, is relatively great, then the presupposition for the inventive radial nesting of the second and fourth planetary gearsets is conceived by the stationary ratio of the second planetary gearset in the range of minus 1.6 enables the use of a sun gear with a comparatively large diameter, avoiding a situation where the planet gears of the (radially outer) second planetary gearset rotate at an operationally excessive speed; the stationary ratio of the fourth planetary gearset in the range of minus 2.0 enables a ring gear with a comparatively small diameter, avoiding a situation where the sun gear of the (radial inner) fourth planetary gearset would be designed to be too small to transfer the required torque. On this account, due to the fact that the ring gear of the (radially inner) fourth planetary gearset is connected directly with the sun gear of the of (radially outer) second planetary gearset, it is possible that the ring gear and the sun gear can be combined into a common gear assembly component. This combination of the second and fourth planetary gearsets allows a material reduction in the space otherwise occupied by the gearsets.

The support structure for the bearing of the two radially interposed planetary gearsets can, from a designer's standpoint, be easily realized. Accordingly, for example, the carrier of the radial inner, fourth planetary gearset of the gearset group, can now be placed radially above the input drive shaft, in other words, above the first shaft of the transmission and affixed to the transmission housing. More exactly, this location is, for example, radially disposed on a hub affixed to the transmission-housing or is radially situated on the third shaft of the transmission. The carrier of the radially outer second planetary gearset of the gearset group can be secured, for example, radially on the third shaft of the transmission.

By way of using only five shifting elements in connection with the inventive arrangement of the proximally assembled four planetary gearsets, it is possible to construct an 8-speed automatic transmission with four individual, gear stages forming planetary gearsets, allowing an extraordinarily short length of construction for the transmission. The spatial length requirement of the four planetary gearsets is, with the above arrangement, not greater than that of four axially and successively aligned, individual planetary gearsets. To this extent, the inventive automatic transmission is especially well suited for installation in a vehicle with a transverse drive motor where the input and output shafts are in an axis-parallel alignment.

By way of the inventive embodiment of the multi-speed transmission, it is possible, especially for passenger vehicles, to have the ratios in a desirable range with a large combined spread and harmonic shifting of gearsets. This results in an increase in riding comfort and a significant reduction of deterioration and wear.

Moreover, with the inventive multi-speed transmission and with the aid of a small number of shifting elements, namely, two brakes and three clutches, expenditures for manufacture and assembly are likewise reduced. In an advantageous manner, it is possible, in the case of the inventive multi-speed transmission, to initiate driving with a hydrodynamic converter, an external startup clutch or even with a number of external startup elements. Consideration can also be given to the possibility of initiating drive with an appropriate element integrated within the transmission. Advantageously, one of the two brakes is adaptable for this purpose because the brake is actuated in the first and the second forward gearset and in the reverse gearset.

Moreover, the inventive multi-speed transmission has a high degree of efficiency in all gearsets, first, as a result of low slippage losses, since in respective gearset, only two shifting elements are disengaged and, second, low losses of tooth wear occur in the simply construction of the individual planetary gearsets.

In addition, the inventive multi-speed transmission is adaptable to comply with requirements of various drivetrain arrangements both in the direction of power flow, as well as in the spatial positioning of the components. On the account of these advantages, it is possible, without special design measures, to align the input and output shafts of the transmission in an axis parallel or co-axial manner in relation to one another.

Regarding the inventive spatial arrangement of the four planetary gearsets relative to one another, it is advantageous for the first and the second shifting elements, when spatially considered, to be placed in an area proximal to the first planetary gearset. Advantageously, the second shifting element in this arrangement and with respect to the spatial layout can be arranged in an area radially located above the first planetary gearset. Further, the first shifting element can be arranged in an area axially beside the first planetary gearset on a side thereof, which is remote from the radially intermeshing gearset groups.

Concerning the inventive spatial arrangement of the four planetary gearsets relative to each other, it is advantageous for the third and fifth shifting elements, when spatially considered, to be axially placed in an area between the third planetary gearset and the radially interposed gearset group. The fourth shifting element can, again with respect to spatial requirements, optionally be located in an area axially between the third planetary gearset and the radially intermeshing gearset group or, however, in an area axially aligned between the radially intermeshing gearset group and the first planetary gearset or yet, in an area radially located above the radially intermeshing gearset group.

BRIEF DESCRIPTION OF THE DRAWINGS

The invention will now be described, by way of example, with reference to the accompanying drawings. The same or comparable components are, in this description and explanation, provided with the same reference numbers. There is shown in:

FIG. 7 is an exemplary shifting diagram for the multi-speed transmission in accord with FIGS. 1 to 6;

DETAILED DESCRIPTION OF THE INVENTION

Figure 1:
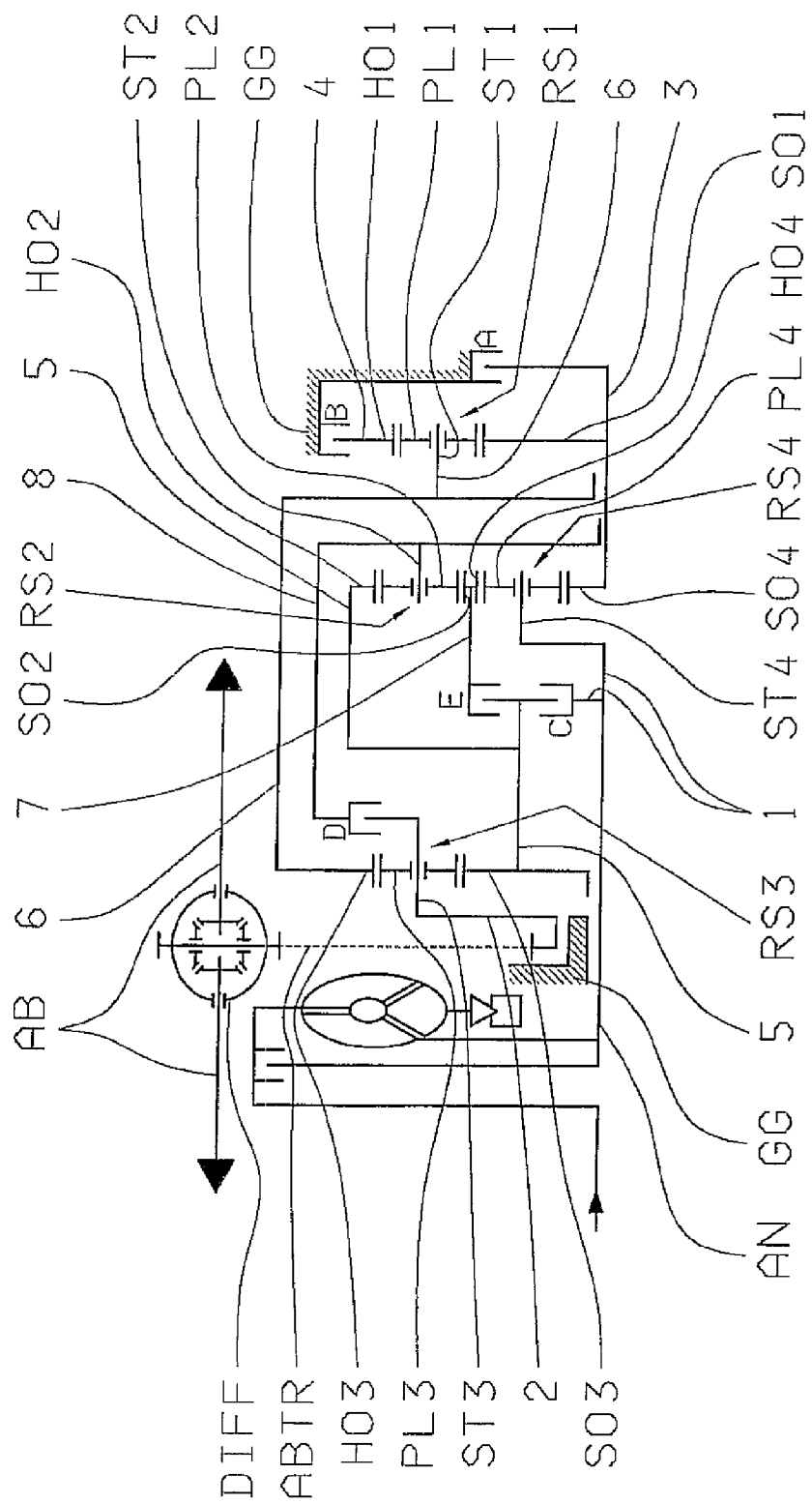
FIG. 1 is a schematic presentation of a first embodiment of an inventive multi-speed transmission.

In FIG. 1 is a first example of an embodiment of the inventive multi-speed transmission. The transmission comprises one input shaft AN, one output shaft AB, four planetary gearsets RS1, RS2, RS3, RS4 and five shifting elements A, B, C, D, E all of which are contained in a housing GG of the transmission. The four planetary gearsets RS1, RS2, RS3, RS4 are all constructed as negative-planetary gearsets. A negative-planetary gearset has planet gears, as is known, which mesh with the sun and internal gears thereof. The ring gears of the four planetary gearsets RS1, RS2, RS3, RS4 are designated as HO1, HO2, H03, H04, the sun gears are, namely SO1, SO2, SO3 and SO4, the planet gears are designated PL1, PL2, PL3 and PL4 and the carriers, on which the planet gears are rotatably supported, bear the reference numbers ST1, ST2, ST3 and ST4. The shifting elements A and B serve as brakes, which, in the presented embodiment, operate as frictionally based, shiftable disk brakes. Obviously, in another embodiment, these could be frictionally based, shiftable band brakes or, for example, also grab or cone brakes with shape-fit holding capabilities. The shifting elements C, D and E are clutches which, in the present embodiment, are of the shiftable disk types. Obviously in another embodiment, these could be designed as shape-fit, shiftable grab or cone clutches.

With selective shifting of these five shifting elements A to E, eight forward gearsets and at least one reverse gearset are implemented. The inventive multi-speed transmission has, in total, at least eight rotatable shafts, which are designated by the reference numbers 1 through 8.

With reference to the multi-speed transmission of FIG. 1 and in regard to the kinematic coupling of the individual components of the four planetary gearsets RS1, RS2, RS3, RS4 with each other and their connections to the input and output shafts AN, AB, the following is to be stated: the carrier ST4 of the fourth planetary gearset RS4 and the input shaft AN are rotationally affixed to one another and form the first shaft 1 of the transmission. The carrier ST3 of the third planetary gearset RS3 and the output shaft AB are connected together and form the second shaft 2 of the transmission where, between this carrier ST3 and the output shaft AB an output-stage, namely ABTR, and a differential DIFF are kinematically interconnected. The output-stage may be designed as a chain drive or a spur pinion drive. The sun gear SO1 of the first planetary gearset RS1 and the sun gear SO4 of the fourth planetary gearset RS4 are rotationally affixed to each other and form the third shaft 3 of the transmission. The ring gear HO1 of the first planetary gearset RS1 forms the fourth shaft 4 of the transmission. The ring gear HO2 of the second planetary gearset RS2 and the sun gear SO3 of the third planetary gearset RS3 are rotationally affixed to one another and form the fifth shaft 5 of the transmission. The carrier ST1 of the first planetary gearset RS1 and the ring gear HO3 of the third planetary gearset RS3 are rotationally affixed to one another and form the sixth shaft 6 of the transmission. The sun gear SO2 of the second planetary gearset RS2 and the ring gear HO4 of the fourth planetary gearset RS4 are rotationally affixed, one to the other, and form the seventh shaft 7 of the transmission. The carrier ST2 of the second planetary gearset RS2 forms the eighth shaft 8 of the transmission.

In regard to the coupling of the five shifting elements A to E to the above described shafts 1 to 8, depicted in FIG. 1, provision is made for the following. The first shifting element A is placed in the power flow between the third shaft 3 and the transmission housing GG. The second shifting element B is placed in the power flow between the fourth shaft 4 and the transmission housing GG. The third shifting element C is placed in the power flow between the fifth shaft 5 and the first shaft 1. The fourth shifting element D is placed in the power flow between the eighth shaft 8 and the second shaft 2. The fifth shifting element E finally is in the power flow between the seventh shaft 7 and the fifth shaft 5. If the fifth shifting element E is engaged, then the second planetary gearset RS2 is inherently locked, i.e., the sun gear SO2 and the ring gear HO2 of the second planetary gearset RS2 turn at the same speed of rotation.

In the embodiment shown in FIG. 1, the third planetary gearset RS3 is on the side of the transmission, which is proximal to the input shaft of the transmission, the first planetary gearset RS1 is on the side of the transmission opposite the input shaft of the transmission and the input and output shafts AN, AB are located, for example, such that their axis are parallel to one another. The second and the fourth planetary gearsets RS2, RS4, as seen in the axial direction, are radially located in a plane, one above the other. For example, this means that the second and fourth planetary gearsets RS2, RS4 are intermeshing together in such a manner that the fourth planetary gearset RS4 is to be found centrally located within the second planetary gearset RS2. With this arrangement, the ring gear HO4 of the radially inner planetary gearset RS4 simultaneously forms the sun gear SO2 of the radially inner planetary gearset RS2. The gearset group with the two intermeshing planetary gearsets RS2, RS4, regarding its spatial location, is in an area axially located between the other two planetary gearsets, namely RS3, RS1.

The output-step ABTR, as described, is in the form of a chain or a spur pinion drive. This output-step ABTR communicates with the axis-parallel arrangement of the input and output shafts AN, AB and in the depicted embodiment is located proximal to the input side. Further, seen in regard to its spatial placement, the output-step ABTR axially and directly borders the third planetary gearset RS3, i.e., borders on that side thereof, which is remote from the gearset group, i.e., the radially intermeshing planetary gearsets RS2, RS4. In the presented embodiment, this output-step ABTR, again with consideration given to spatial allowances, is placed between the planetary gearset RS3 and a torque converter, which is connected to the input shaft AN and is connected to the drive motor of the transmission which, for the sake of clarity, is not further described in detail. Correspondingly, the third planetary gearset RS3 is axially passed through only by the input shaft AN, which is fixed to the shaft 1 of the transmission, the other planetary gearsets RS1 and RS4 are not passed through centrally and axially by any shaft of the transmission. Obviously, provision may be made in another embodiment, where the drive motor of the transmission is placed on the side of the transmission on which the first planetary gearset RS1 is located where, in such a case, the output-step ABTR would be found on the therefrom oppositely lying side of the transmission. Next, the first and fourth planetary gearsets RS1, RS4 would be centrally and axially passed through by the input shaft AN, i.e., the shaft 1 of the transmission and, finally, the third planetary gearset RS3 would not be axially and centrally passed through by any shaft.

As is further exhibited in FIG. 1, the two brakes A, B, with regard to their spatial layout, are placed in an area proximal to the first planetary gearset RS1. In the presented embodiment, the brake B—especially a disk set of brake B —again seen with regard to spatial layout, is placed at least partially radially above the first planetary gearset RS1. Brake A, spatially seen, is placed on the side of the first planetary gearset RS1, which is remote from the second and fourth planetary gearsets RS2, RS4, adjacent the first planetary gearset RS1. A disk set of brake A, for example, is placed at a smaller diameter than brake B. Deviating from the presentation of FIG. 1, it is possible that brake B can even be designed as a band brake. The servo apparatus (which is not described in greater detail) of the two brakes A and B, for the actuation of the respective disk sets of brakes A and B, for example in a simple manner of design, can be integrated into the transmission housing GG, i.e., abutting that wall of the transmission housing GG, which borders the first planetary gearset RS1.

As further shown in FIG. 1, the clutches C and E, spatially observed, are in an area axially located between the planetary gearset RS3 and the two radially intermeshing planetary gearsets RS2, RS4. In the depicted presentation, the clutches C and E, considered radially, are placed one above the other, with a disk set of the clutch E disposed on a greater diameter than a disk set of the clutch C. Additionally, the disk set of the clutch E is essentially placed radially above this disk set of the clutch C, to effectively simplify the design by using of a common disk carrier for the two clutches C and E. In the presented embodiment, this common disk carrier is designed as an outer disk carrier for the advantageous retention of steel disks from the disk set of the clutch C and is also designed as an inner disk carrier for the advantageous retention of steel disks from the disk set of the clutch E. Correspondingly, the shaft 7 possesses a section, which can serve as an outer disk carrier, advantageously for the retention of coated disks of the disk set of the clutch E. Further, advantageously, the shaft 1 possesses a section, which is designed to serve as an inner disk carrier for the retention of coated disks of the disk set of the clutch C. In FIG. 1, the servo apparatus of the clutch C (not shown in detail) for the actuation of the disk set thereof, can in an advantageous manner be placed in the inner disk carrier of the clutch C such that it is axially slidable along and rotates at the same speed as the input shaft AN. Correspondingly, it is advantageous if the servo apparatus of the clutch C possesses a dynamic pressure compensation means. A servo apparatus of the clutch E (not shown in greater detail in FIG. 1) serves for the actuation of the disk set of the clutch E and can be, in a simply designed manner, axially and slidably located on the outer disk carrier of the clutch E, such that it rotates at the same rotational speed as the shaft 7. Again, correspondingly, it is advantageous if the servo apparatus of the clutch E, likewise, has a dynamic pressure compensation means. A means for delivering a pressure medium and a lubricant to the servo apparatuses of the clutches C and E, in a simple manner of design, can be accomplished by appropriate borings, i.e., these being transport conduits from the input shaft AN.

Further to be gained from an inspection of FIG. 1 is that a disk set of the clutch D, spatially observed, is placed axially between the third planetary gearset RS3 and the two radially interposedly intermeshing planetary gearsets RS2, RS4, with the disk set bordering directly on the third planetary gearset RS3. In FIG. 1, a servo apparatus of clutch D (not shown in detail), intended for the activation of the disk set thereof, can be slidably and easily axially placed on the outer disk carrier of the clutch D and would thereby rotate at the same rotational speed as the shaft 8. Correspondingly, it is also advantageous, for the servo apparatus of the clutch D to possess a dynamic pressure compensation means. With regard to spatial layout, the servo apparatus of the clutch D directly neighbors that disk set, which has been assigned thereto. Again spatially observed, the servo apparatus of the clutch D can primarily be placed on the side of the two radially intermeshing planetary gearsets RS2, RS4, proximal to the first planetary gearset RS1. In conformance to this situation, an actuation element of the servo apparatus, which energizes the disk set of the clutch D, radially bypasses the second planetary gearset RS2 in the axial direction. Alternately, it is possible that an actuation element of this servo apparatus, which energizes the disk set of the clutch D, radially and axially bypasses the shaft 8, such that the disk set of the clutch D is actuated for engagement thereof in the direction of the fourth planetary gearset RS4. Means for pressure and lubrication media delivery, which is directed to the servo apparatuses of the clutch D, in a simple manner of design, can be accomplished by appropriate borings, i.e., these being transport conduits from the shaft 3.

From the spatial arrangements of the three clutches C, D, E, as presented in FIG. 1, it becomes obvious that:
- the first shaft 1 passes sectionally within the fifth shaft 5 and passes sectionally within the seventh shaft 7;
- the fifth shaft 5 passes within the eighth shaft 8;
- the eighth shaft 8 passes within the sixth shaft 6;
- the fifth shaft 5 completely envelopes the clutches C and E in an axial and radial direction;
- the sixth shaft 6 completely envelopes the second planetary gearset RS2 and the three clutches C, D, E in an axial and radial direction, and
- the eighth shaft 8 completely envelopes the second and the fourth planetary gearsets RS2, RS4 as well as the clutches C and E, in an axial and radial direction.

Accordingly, the shaft 8, that is to say, the carrier ST2 of the planetary gearset RS2, is rotationally fixed to the shaft 3, which has been formed from the sun gear shaft of the transmission. Further, the shaft 6, i.e., the carrier ST1 of the planetary gearset RS1, for example, is likewise rotationally fixed on the sun gear shaft 3. In addition, in the embodiment, depicted in FIG. 1, the shaft 5, i.e., the carrier ST3 of the planetary gearset RS3 is rotationally fixed to the input shaft AN, i.e., that is, to the shaft 1 or in another embodiment, it is also possible that the rotationally fixed coupling is accomplished by direct coupling with the transmission housing GG, i.e., on a transmission housing fixed hub. Further, a spur gear or chain actuated gear of the output-step ABTR, which is connected to the shaft 2, for example is rotationally fixed to the housing GG, i.e., more exactly to a hub fixed to the transmission housing.

In another embodiment of the inventive transmission, which deviates from the embodiment of FIG. 1, the disk set and the servo apparatus of the clutch D, with regard to its spatial layout, is placed in an area between the first planetary gearset RS1 and the two radially intermeshing planetary gearsets RS2, RS4, then the shaft 8 no longer completely encompasses the second and fourth planetary gears RS2, RS4 and the clutches C, E in the axial and radial directions, but rather encompasses the shaft 2. In still another embodiment of the transmission, it is possible to arrange the disk set of the clutch D, again observed with respect to its physical placement, at least partially radially above the second planetary gearset RS2. This latter arrangement presupposes that a somewhat comparatively larger radial installation space is available in the transmission. In still another embodiment of the inventive transmission, it is possible for the disk set of the clutch D, when observed with spatial consideration, to be placed at least radially above the disk set of the clutch E.

Figure 2:
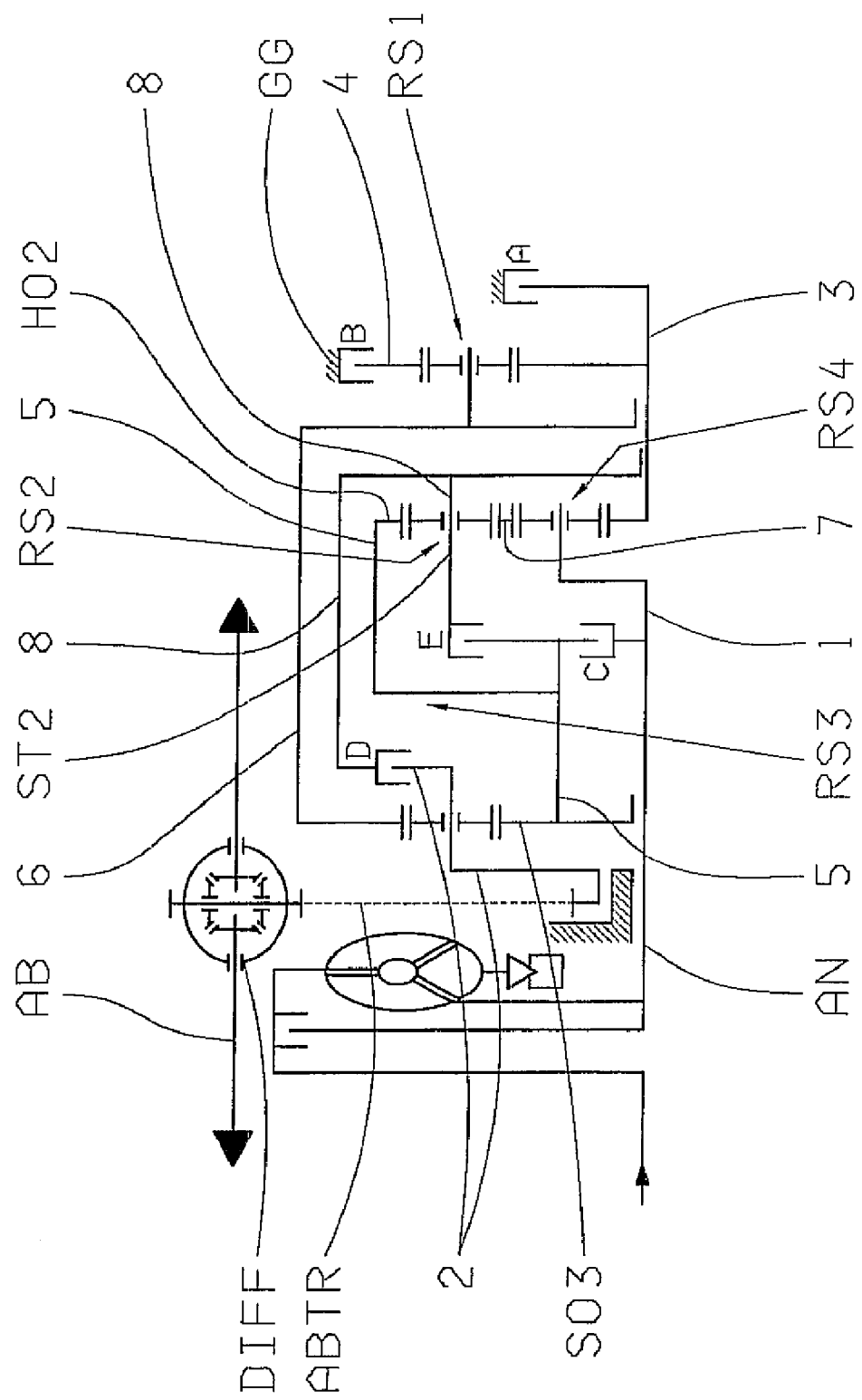
FIG. 2 is a schematic presentation of a second embodiment of an inventive multi-speed transmission.

FIG. 2 shows a second embodiment of an inventive multi-speed, automatic transmission, based on the gearset and spatial arrangement of the first completely described embodiment presented in FIG. 1. The single difference between FIG. 2 and FIG. 1 lies in the kinematic connection of the clutch E to the second planetary gearset RS2. The difference is that the clutch E is placed in the power flow, between the shaft 5 and the shaft 8 of the transmission. According to FIG. 2, also, the mutually connected central gears SO3 and HO2, can be connected with the carrier ST2 of the second planetary gearset RS2 where, when the clutch E is engaged as shown in FIG. 1, the second planetary gearset RS2 must rotate as a group.

Figure 3:
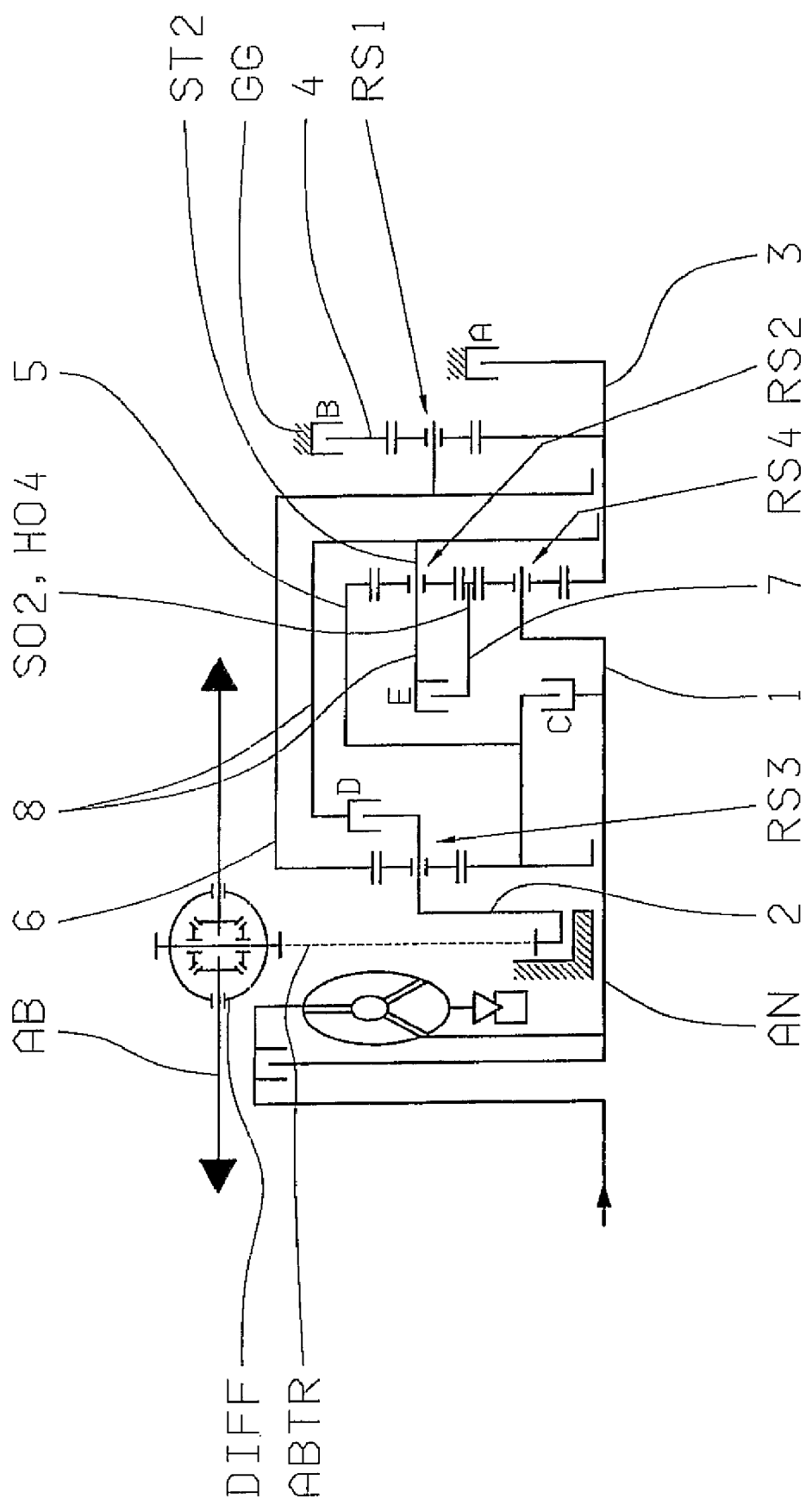
FIG. 3 is a schematic presentation of a third embodiment of an inventive multi-speed transmission.

FIG. 3 shows a third embodiment of an inventive multi-speed, automatic transmission, based on the gearset and the spatial arrangement of the first completely described embodiment presented in FIG. 1. The single difference from FIG. 1 again concerns the kinematic connection of the clutch E to the second planetary gearset RS2. In difference with FIG. 1 and FIG. 2, the clutch E is now placed in the flow of power between the shaft 7 and the shaft 8 of the transmission. According to with FIG. 3, additionally the mutually connected central gears HO4 and SO2, by way of the clutch E, can be connected with the carrier ST2 of the second planetary gearset RS2, where the second planetary gearset RS2 rotates as a group when the clutch E is engaged as it is in the cases of FIGS. 1 and 2.

Figure 4:
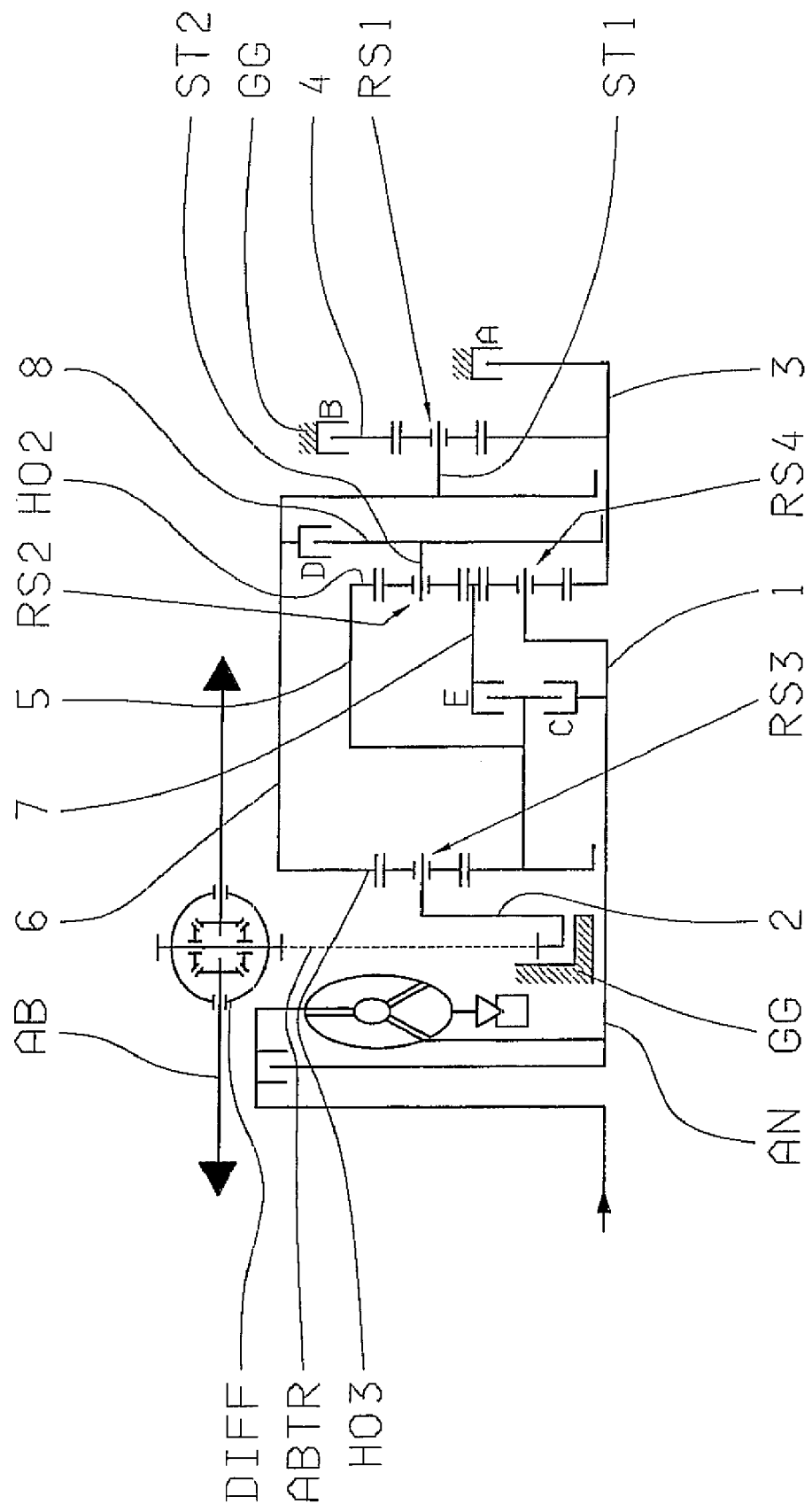
FIG. 4 is a schematic presentation of a fourth embodiment of an inventive multi-speed transmission.

FIG. 4 shows a fourth embodiment of an inventive multi-speed, automatic transmission, based on the gearset and spatial arrangement of the first completely described embodiment presented in FIG. 1. The single difference from FIG. 1 concerns the kinematic binding of the clutch D. As a difference from FIG. 1, the clutch D is now located in the power flow between the shaft 8 and the shaft 6 of the transmission. According to FIG. 3, the ring gear HO3 of the third planetary gearset RS3, which is coupled to the carrier ST1 of the first planetary gearset RS1, is further connected to the carrier ST2 of the second planetary gearset RS2 by way of the clutch E. According to FIG. 4, the output shaft AB of the transmission is also connected with a gearset element, i.e., operationally coupled, but not by way of any shifting element, with one or more additional planetary gearset elements.

Corresponding to these couplings of the clutch D, which are kinematically changed in reference to FIG. 1, there is created, contrary to FIG. 1, an advantageous spatial arrangement of the clutch D within the transmission housing GG and in relation to the position of the planetary gearsets. In the embodiment presented in FIG. 4, the clutch D is located in an area between the radially intermeshing planetary gearsets RS2, RS4 and the first planetary gearset RS1. In this way, it is possible that the disk set of the clutch D, for example, again with appropriate spatial considerations, can be placed at least partially radially above the ring gear HO2 of the planetary gearset RS2. Not shown in detail in FIG. 4 for the sake of simplicity, a servo apparatus of the clutch D, which actuates the disk sets thereof, in a simply designed manner, can be axially and slidably placed on a section of the shaft 6, a part of which acts as an outer disk carrier. Corresponding thereto, the servo apparatus is then proximal to the carrier ST1 of the first planetary gearset RS1 and is rotationally fixed to the shaft 3. In this arrangement, the servo apparatus of the clutch D continually rotates at the rotational speed of the shaft 6 and advantageously possesses also a dynamic pressure compensation means. Further, the necessary pressure and lubrication means are supplied through a feed by way of simply designed appropriate borings, these being transport conduits from the shaft 3.

Figure 5:
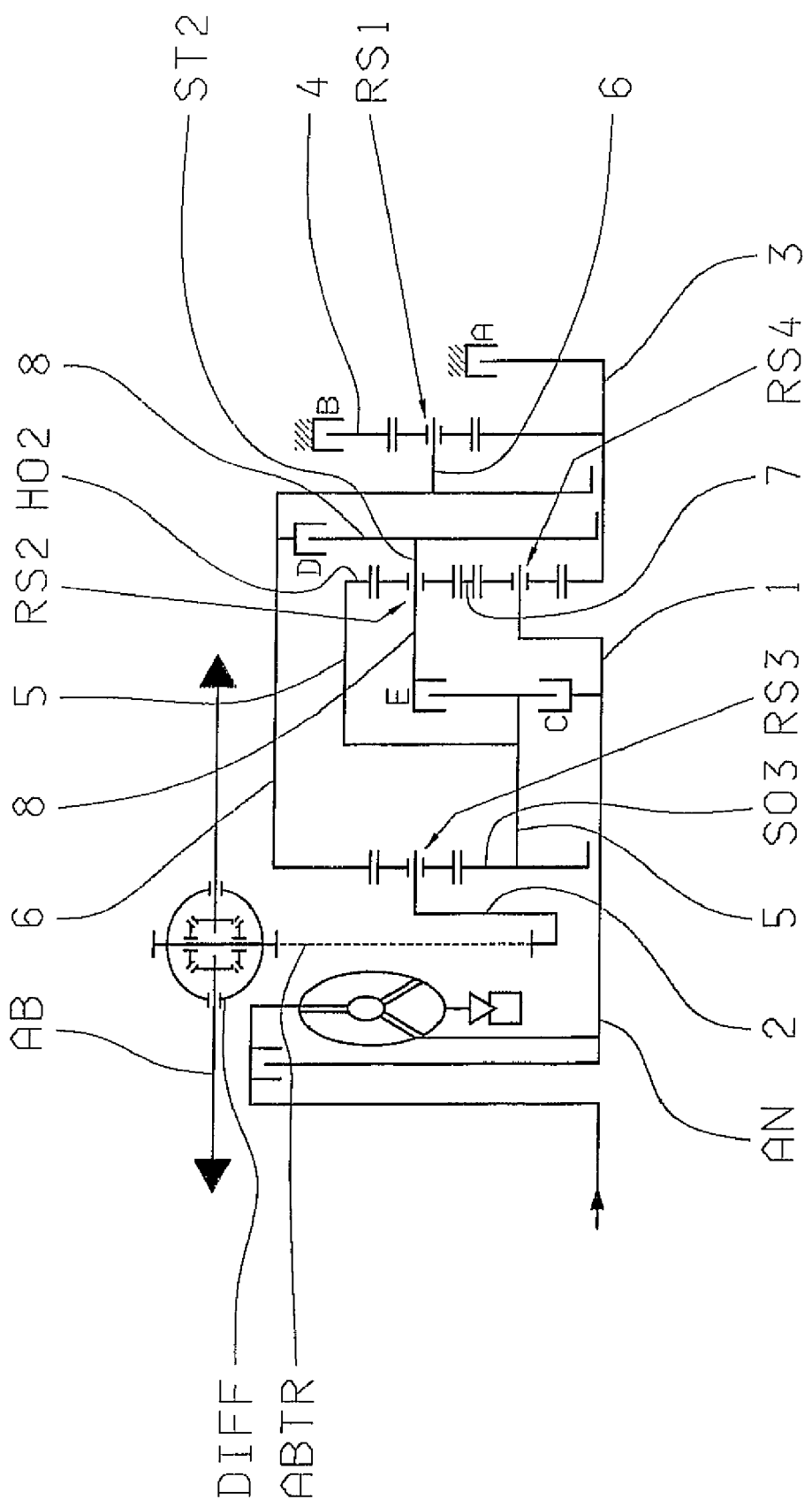
FIG. 5 is a schematic presentation of a fifth embodiment of an inventive multi-speed transmission.

In FIG. 5, a fifth embodiment of an inventive multi-speed, automatic transmission is shown, which is based on the gearset and the spatial arrangement of the transmission as explained above in a fourth example of FIG. 4. The single difference from FIG. 4 concerns the kinematic connection of the clutch E to the second planetary gearset RS2. As shown in FIG. 2, the clutch E is now placed in the power flow between the shaft 5 and the shaft 8 of the transmission. Regarding FIG. 5, further the mutually connected central gears SO3 and HO2, by way of the clutch E, are connected to the carrier ST2 of the second planetary gearset RS2, where the second planetary gearset RS2, when the clutch E is engaged, as in FIG. 4 (and as in FIGS. 1, 2 and 3), rotates as a group.

Principally, the situation as presented in FIG. 5 concerns the gearset layout and the component arrangements of the FIGS. 2 and 4 in a fifth inventive transmission.

Figure 6:
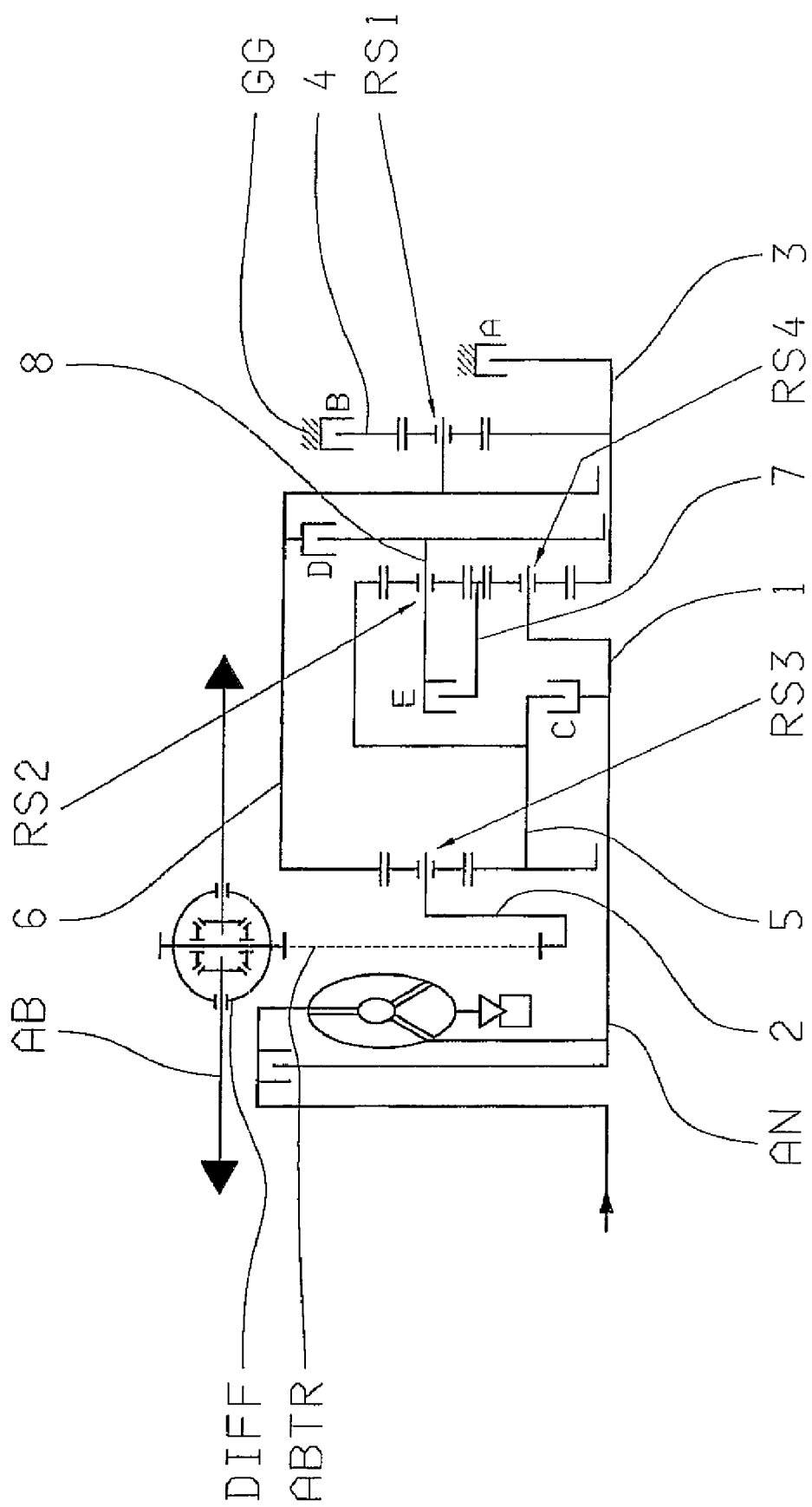
FIG. 6 is a schematic presentation of a sixth embodiment of an inventive multi-speed transmission.

FIG. 6 shows a sixth embodiment of an inventive multi-speed, automatic transmission, which is based on the gearset and the spatial arrangement of the transmission, as explained above, in the fourth example of FIG. 4. The single difference from FIG. 4 concerns again the kinematic connection of the clutch E to the second planetary gearset RS2. As demonstrated in FIG. 3, the clutch E is now arranged in the power flow between the shaft 7 and the shaft 8 of the transmission. Accord to FIG. 6, even the mutually connected central gears HO4 and SO2, by way of the clutch E, can be connected with the carrier ST2 of the second planetary gearset RS2, with the second planetary gearset RS2 rotating as a group, when the clutch E is engaged as in FIG. 4 (and in FIGS. 1, 2, 3 and 5).

Principally, in the case of FIG. 6 and the sixth inventive transmission shown therein, it is possible to include a combination of the gearset arrangements and the placement of components as seen in FIGS. 3 and 4.

FIG. 7 presents an exemplary multi-speed transmission shifting diagram, which encompasses all the above embodiments found in the FIGS. 1 to 6. In each gearset three shifting elements are shown in the engaged state and two shifting elements in the disengaged state. Besides the shifting logic, it is possible to also derive from the shifting diagram, the exemplary values for the respective ratios i of the individual gearsets and also the progressive ratios φ which may be calculated therefrom. The given ratios i arise from the (typical) stationary ratios of the four planetary gearsets RS1, RS2, RS3, RS4, these being namely, minus 2.10 minus 1.60, minus 3.70 and minus 2.00. First, because of the fact that, in the present case, the stationary ratio of the second planetary gearset RS2 is, as far as value is concerned, is sufficiently small and, simultaneously, the stationary ratio of the fourth planetary gearset RS4, likewise, is sufficiently great, the presupposition for the inventive radial intermeshing of the second and fourth planetary gearsets provides that the stationary ratio of the planetary gearset RS2, approximately minus 1.6, enables a sun gear SO2 with a comparatively large diameter while, advantageously, the planet gears PL2 of the planetary gearset RS2 do not rotate at too high a speed; the stationary ratio of the planetary gearset RS4, approximately minus 2.0, enables a ring gear HO4 to have a comparatively small diameter with caution that the sun gear SO4 of the planetary gearset RS4 need not be too small to permit the transfer of torque of the required magnitude.

Further derivations from the shifting diagram indicate that sequential, group shifting through the gears can be avoided, since any two successive gearsets, which are used in the gear sequence, are proximal to one another employ two common shift elements. The sixth gearset is advantageously constructed as a direct gear.

The first forward gearset is attained by engaging of brakes A and B and the clutch C; the second forward gearset is reached by the engagement of brakes A and B and the clutch E; the third forward gearset is achieved by the engagement of brake B and the clutches C and E; the fourth forward gearset is attained by the engagement of brake B and the clutches D and E; the fifth forward gearset is reached by the engagement of brake B and the clutches C and D; the sixth forward gearset is reached by the engagement of the clutches C, D and E; the seventh forward gearset is reached by the engagement of brake A and the clutches C and D, and the eighth forward gearset is attained by the engagement of brake A and the clutches D and E. As the shifting diagram indicates further, the reverse gearset is reached by the engagement of brakes A and B and the clutch D.

According to the invention, initiating drive of a motor vehicle with a shifting element integrated within the transmission is possible. In this case, a shifting element is particularly well adapted thereto when it is advantageously required both in the first forward gearset, as well as for the reverse gearset. Such an adaptable shifting element would be, in this case, brake A or brake B. In an advantageous manner, both of these brakes A, B are necessary, even in the second forward gearset. If brake B is used as the integrated startup element then drive initiation, even in the first five forward gearsets and in the reverse gearset are possible. Further, as may be inferred from the shifting diagram, it is possible to initiate forward drive by employing the clutch C and for drive initiation in the reverse direction, the clutch D can be used, where both clutches C, D are internal elements in the transmission.

Figure 8:
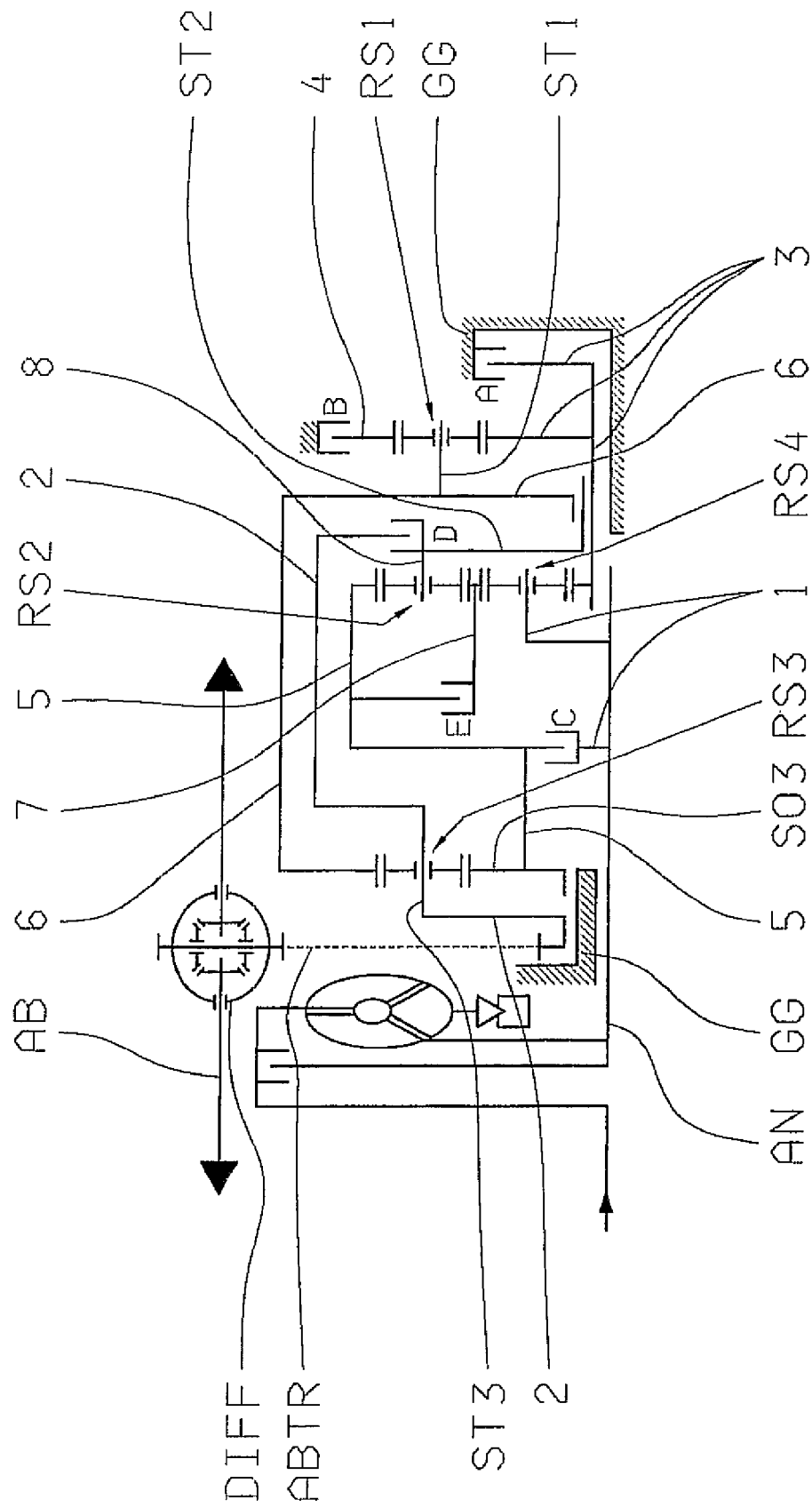
FIG. 8 is an exemplary first component assembly-variant for the multi-speed transmission in accord with FIG. 1.

The spatial arrangement of the shifting elements of the embodiment presented in FIGS. 1 to 6 of the inventive multi-speed automatic transmission can, principally, be optional in nature and be only limited by the overall dimensions of the transmission and the outer shape of the housing GG. Correspondingly, in FIG. 8 is presented a first exemplary component arrangement variation of the multi-speed transmission according to FIG. 1. In this presentation, all kinematic couplings of the gearset elements, shifting elements and shafts are identical to those of FIG. 1. Differences of the other elements in FIG. 1 are detailed below.

The essential change from the embodiment of FIG. 1 concerns a spatial arrangement of the clutch D and an advantageous location of the clutch E. As may be seen in FIG. 8, giving consideration to the spatial limitations, clutch D is now upon the side of the gearset group formed by the radially intermeshing pair of planetary gears RS2 and RS4, which is proximal to the first planetary gearset RS1. In this situation, the disk set of the clutch D directly borders, in an axial manner, the carrier ST2 of the (radial outer) planetary gearset RS2 of the intermeshing pair. In the illustrated example, the inner disk carrier of brake D is connected to this carrier ST2 on the shaft 3 in a rotationally fixed manner and advantageously retains coated disks of the disk set of the clutch D. Correspondingly, by way of the shaft 2, the outer disk carrier of the clutch D is connected to the carrier ST3 of the third planetary gearset RS3 and to the output stage ABTR. This shaft 2 envelopes the planetary gearset RS2, that is, in more detail, radially envelopes in an axial direction the two planetary gearsets RS2, RS4 and the two clutches C, E. In FIG. 8, the servo apparatus (not shown in detail for the sake of simplicity) actuates the disk set of the clutch D, on this account and is advantageously slidably mounted in an axial direction on this inner disk carrier and, consequently, rotates at the same rotational speed as the shaft 8. Likewise, this speed of rotation is also that of the carrier ST2. Correspondingly, it is possible that the supply of a pressure medium to a pressure chamber of this servo apparatus and a lubricant supply to a compensatory device for the compensation of the rotational pressure generated by the turning of this rotatable pressure chamber can be carried out in a properly designed and simple manner, by way of appropriate borings, i.e., transport conduits, from the transmission housing fixed hub and from the shaft 3.

A further change from the design of FIG. 1 concerns the support of the carrier ST1 of the first planetary gearset RS1 that is to say, the shaft 6. As may be seen in FIG. 8, this carrier ST1, i.e., the shaft 6 is now rotationally fixed to the carrier ST3 of the third planetary gearset RS3. I.e., the shaft 8, and is thus no longer fixed to the shaft 3.

As may further be learned from the FIG. 8, the shaft 7 possesses a section which serves as an inner disk carrier for the retention of coated disks of the disk set of the clutch E. Correspondingly, the shaft 5 possesses a section, which serves as an outer disk carrier for the retention of steel disks of the disk set of the clutch E. In this arrangement, the disk set of the clutch E when seen axially, is placed predominately beside the disk set of the clutch C and in the illustrated embodiment is located at a greater diameter than the disk set of the clutch C and is nearer to the planetary gearset RS2 than the disk set of the clutch C.

From FIG. 1, a further change in the design detail concerns the support of the sun gear SO3 of the third planetary gearset, namely RS3, i.e., the shaft 5. In a difference from FIG. 1, wherein this sun gear SO3, i.e., the shaft 5, had been rotationally fixed to the input shaft AN, i.e., the shaft 1, and on this account is located indirectly above the input shaft AN onto the transmission housing GG, now, according to FIG. 8, the sun gear SO3, i.e., the shaft 5, is now directly rotationally fixed to a transmission housing affixed hub. In another embodiment it is possible that the sun gear SO3 be rotationally fixed on the spur gear or chain driven gear of the output step ABTR, where the spur gear or chain driven gear is connected to the carrier ST3 of the third planetary gearset RS3.

Figure 9:
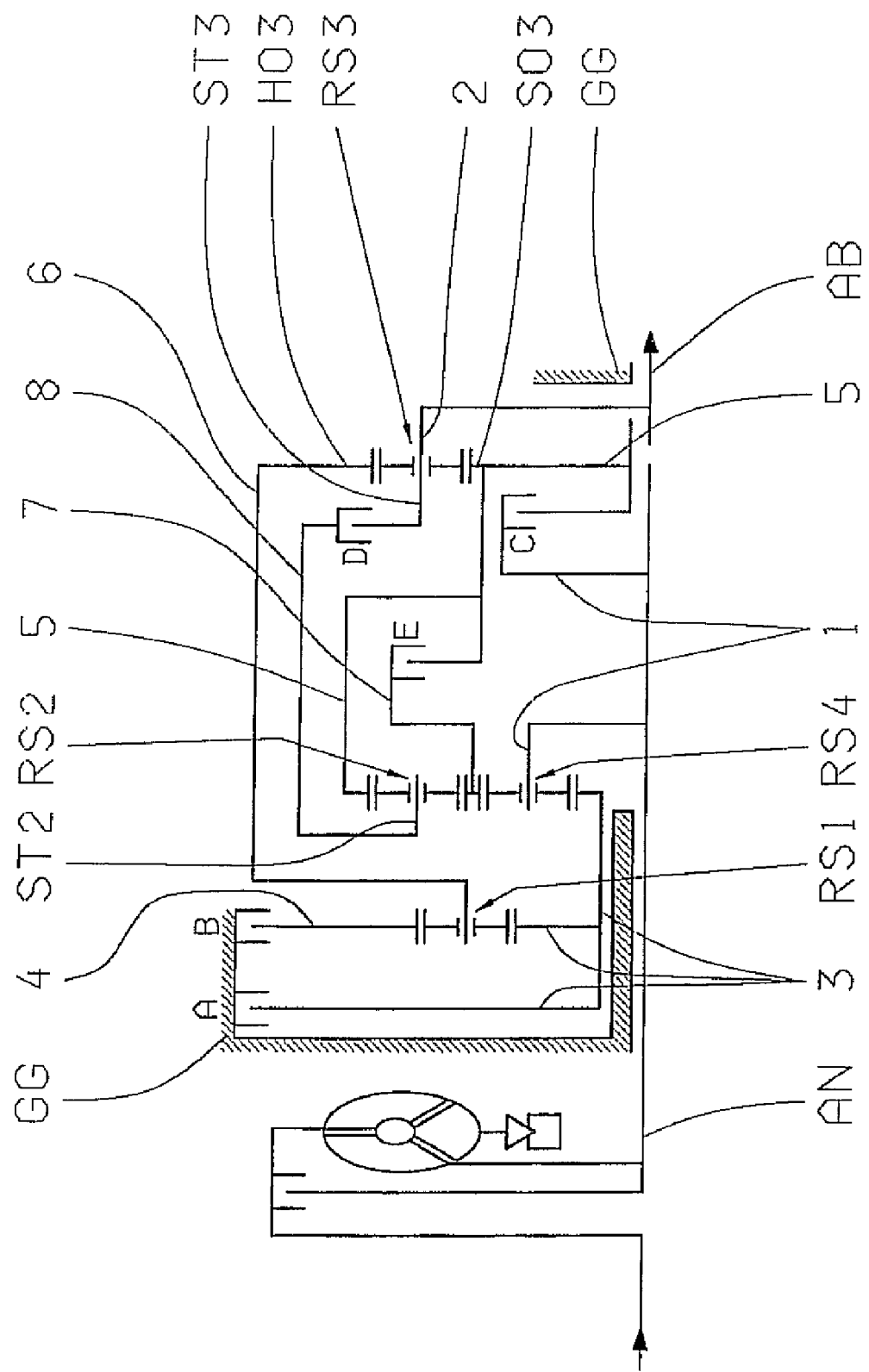
FIG. 9 is an exemplary second component assembly-variant for the multi-speed transmission in accord with FIG. 1.

FIG. 9 shows a second exemplary variation of the given arrangements of the components of the multi-speed automatic transmission based on FIG. 1, where all kinematic couplings of the gearset elements, shifting elements and shafts are, among themselves, the same as those of FIG. 1. In the embodiment shown in FIG. 9 the input shaft AN and the output shaft AB of the transmission are now positioned to be co-axial. As seen axially, the spatial succession of the planetary gearsets within the transmission housing are not altered from that of FIG. 1. In difference from FIG. 1, however, the input shaft of the transmission is arranged on the side of the transmission housing GG, on which the first planetary gearset RS1 and the two brakes A and B have also been installed. Correspondingly, the output shaft of the transmission is now on the side of the transmission housing GG, upon which the third planetary gearset RS3 is also found.

As an example, the two brakes A, B are placed axially beside one another, with their respective disk sets positioned upon diameters of an at least nearly equal distance. For example, the inner disk carrier of brake A and the sun gear 3 are rotationally fixed on a hub anchored to the transmission housing, obviously, it is possible that the disk set of brake B, when seen with spatial considerations in FIG. 9 can be placed radially above the first planetary gearset RS1. In another embodiment of the transmission, again relating to FIG. 9, the disk set of brake B can be axially offset in the direction of the planetary gearset RS2 so that the disk set of brake A, also spatially observed, has the space to be positioned above the first planetary gearset RS1.

Continuing the inspection of FIG. 9, the two clutches C, E and at least the disk set of the clutch D, observed in terms of their spatial requirements, are placed in axial alignment, in an area between the third planetary gearset RS3 and the gearset group, which is formed by way of the two mutually intermeshing planetary gearsets RS2 and RS4. In this present embodiment, the disk sets of the clutches C and D are located essentially one above the other. The clutch E is adjacent the second planetary gearset RS2. The two clutches C, D are located to immediately border the third planetary gearset RS3 and the disk set of the clutch D is adjacent to the planetary gearset RS3 in the area of its internal gear HO3, and the disk set of the clutch C axially borders, in immediate proximity, the planetary gearset RS3 in the area of the sun gear SO3 thereof.

A section of the shaft 7 serves as an outer disk carrier for the clutch E and retains, advantageously, coated disks of the clutch E. Correspondingly, a section of the shaft 5 is designed to be an inner disk carrier of the clutch E and holds, advantageously, steel disks of the disk set of the clutch E. In a manner related to the co-axial arrangement of the input and output shafts, the shaft 5 is now rotationally fixed to both the input shaft AN, i.e., the shaft 1, as well as to the output shaft AB, i.e., the shaft 2. With this arrangement, this support section, spatially considered, is located in the area radially underneath the sun gear SO3 of the third planetary gearset RS3. In the area of this supporting section and near the sun gear SO3, is also a section of the shaft 5, which is designed as an inner disk carrier of the clutch C, and advantageously, serves to receive the steel disks of the disk set of the clutch C. Correspondingly, a cylindrical section of the shaft 1 forms the outer disk carrier of the clutch C and retains, advantageously, coated disks of the disk set of the clutch C.

Deviating from the presentation of FIG. 9, it is possible that in another embodiment of the inventive transmission for example, it may also be provided that the clutch C be placed on that side of the third planetary gearset RS3, opposite to the gearset component group RS2/RS4.

Further to be seen in FIG. 9, a section of the shaft 2 designed as an inner disk carrier for the clutch D in the area of the carrier ST3 of the third planetary gearset RS3, and advantageously receives steel disks of the disk set of the clutch D. The carrier ST2 and the inner disk carrier of the clutch D can be assembled in a factory as a common component. Correspondingly a section of the shaft 8 serves as an outer disk carrier of the clutch D and accepts, advantageously, coated disks from the disk carrier of the clutch D. The shaft 8, which is connected to the carrier ST2 of the second planetary gearset RS2, on that side of the planetary gearset, which is from the disk set of the clutch D, completely envelopes, as shown in FIG. 1, the clutch E in an axial direction.

The statements made regarding servo apparatuses of the five frictional based shifting elements, namely A to E, within the description of FIG. 1, in principal, are also applicable to the shifting elements A to E as they appear in the spatial arrangement shown in FIG. 9. Correspondingly, for the type of construction and the arrangement of the disk carriers of the three clutches C, D, E, as shown in FIG. 9, it is of advantage that the servo apparatus of the clutch C be placed within the cylindrical space of the outer disk carrier of the clutch C and the disk set, which is assigned to clutch C, is axially actuated in the direction of the planetary gearset RS3 upon engagement, and that the servo apparatus of the clutch E, is placed within the cylindrical space of the outer disk carrier of the clutch E, that is, within the cylindrical space of the shaft 7, and that the disk set which is assigned thereto, upon axial engagement is actuated in the direction of the planetary gearset RS3. In the case of the embodiment presented in FIG. 9, again it is of advantage that the servo apparatus of the clutch D be placed essentially axially between the first planetary gearset RS1 and the two radially, mutually intermeshing planetary gearsets RS2, RS4 and possesses an activation element, which envelopes the shaft 8 radially in the axial direction and the disk set of the clutch D be actuated axially, upon engagement, in the direction of the planetary gearset RS2.

Figure 10:
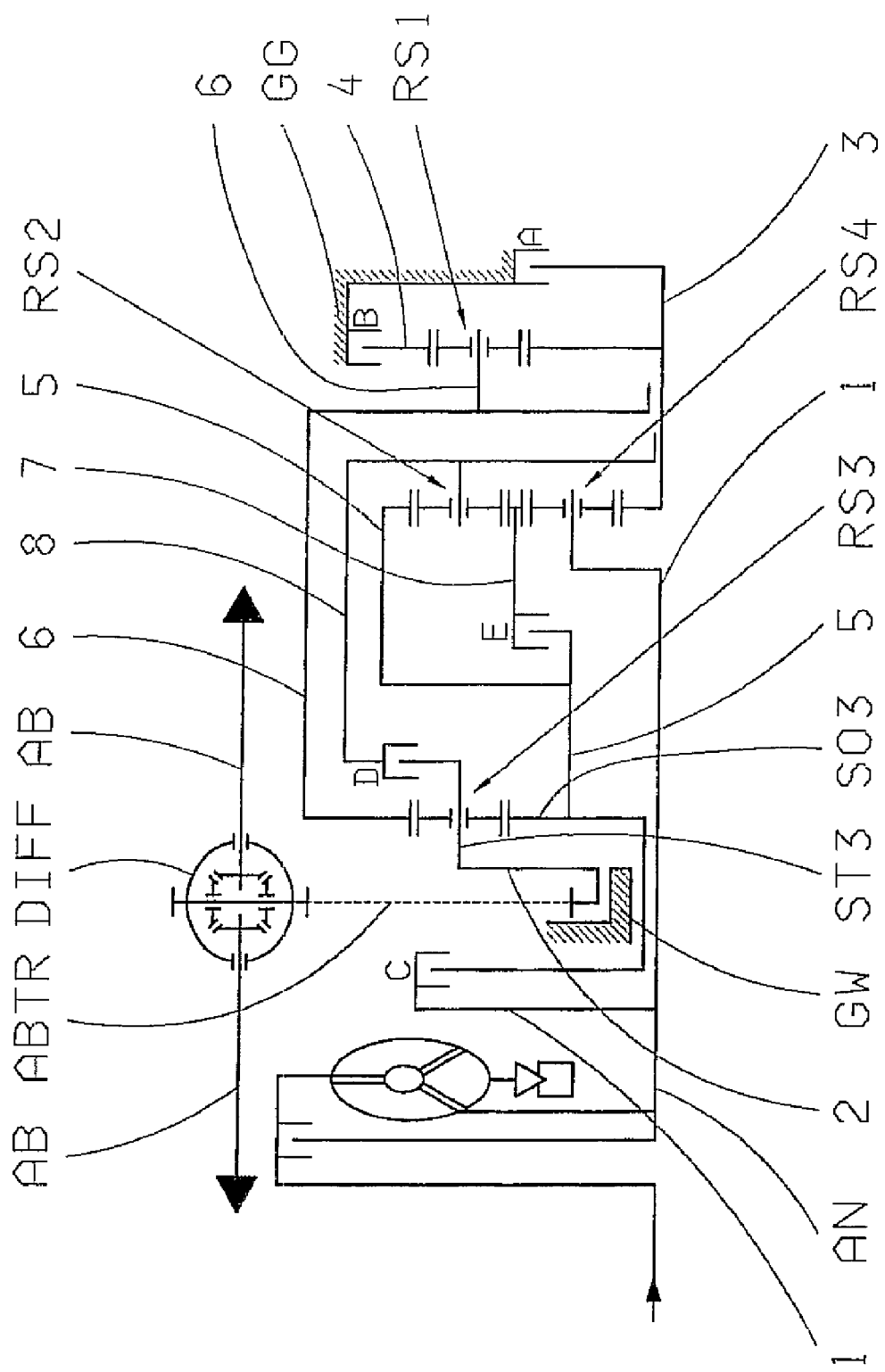
FIG. 10 is an exemplary third component assembly-variant for the multi-speed transmission in accord with FIG. 1.

Finally, FIG. 10 shows a third exemplary component arrangement of the multi-speed, automatic transmission based on FIG. 1, with all the kinematic couplings of the gearset elements, shifting elements and shafts, remaining unchanged from the FIG. 1. However, different from FIG. 1 is that clutch C is now arranged on that side of the third planetary gearset RS3, which is opposite the gearset/double group RS2/RS4, when spatially considered and located on that side of the transmission which is proximal to the input of the transmission. In the embodiment, presented in FIG. 10, an outer disk carrier of the clutch C forms a section of the shaft 1 of the transmission and is connected to the input shaft AN thereof. Correspondingly, an inner disk carrier of the clutch C forms a section of shaft 5 of the transmission. A servo apparatus (not further detailed in FIG. 10 for the sake of simplicity) is enabled in a design based, simple manner to be axially and slidable fixed on the outer disk carrier of the clutch C and is supplied with pressure and lubrication means, by way of appropriate borings, from the input shaft AN and further, the disk set assigned thereto is actuated axially in the direction of the planetary gearset RS3 upon the engagement of the clutch C.

As may be seen additionally in FIG. 10, at least the spur or chain operated gear, which is connected to the carrier ST3 of the third planetary gearset RS3 and is part of the output-stage ABTR is placed axially between the third planetary gearset RS3 and the clutch C so that a section of the shaft 5, which is connected with the inner disk carrier of the clutch C centrally and axially passes through the output stage ABTR. In this arrangement, the shaft 5 is rotationally fixed to the shaft 1, i.e., onto the input shaft AN. In regard to the operative connection of the spur or chain operated gear of the output stage ABTR, which is connected to the carrier ST3 of the third planetary gearset RS3, FIG. 10 shows the possibility that, when spatially considered, and at least predominate lengthening has been designed for the transmission wall GW of the transmission housing GG, such that the two are rotationally fixed and serve, in a sectional manner, as a support structure for the spur or chain operated gear of the output stage ABTR.

Figure 11:
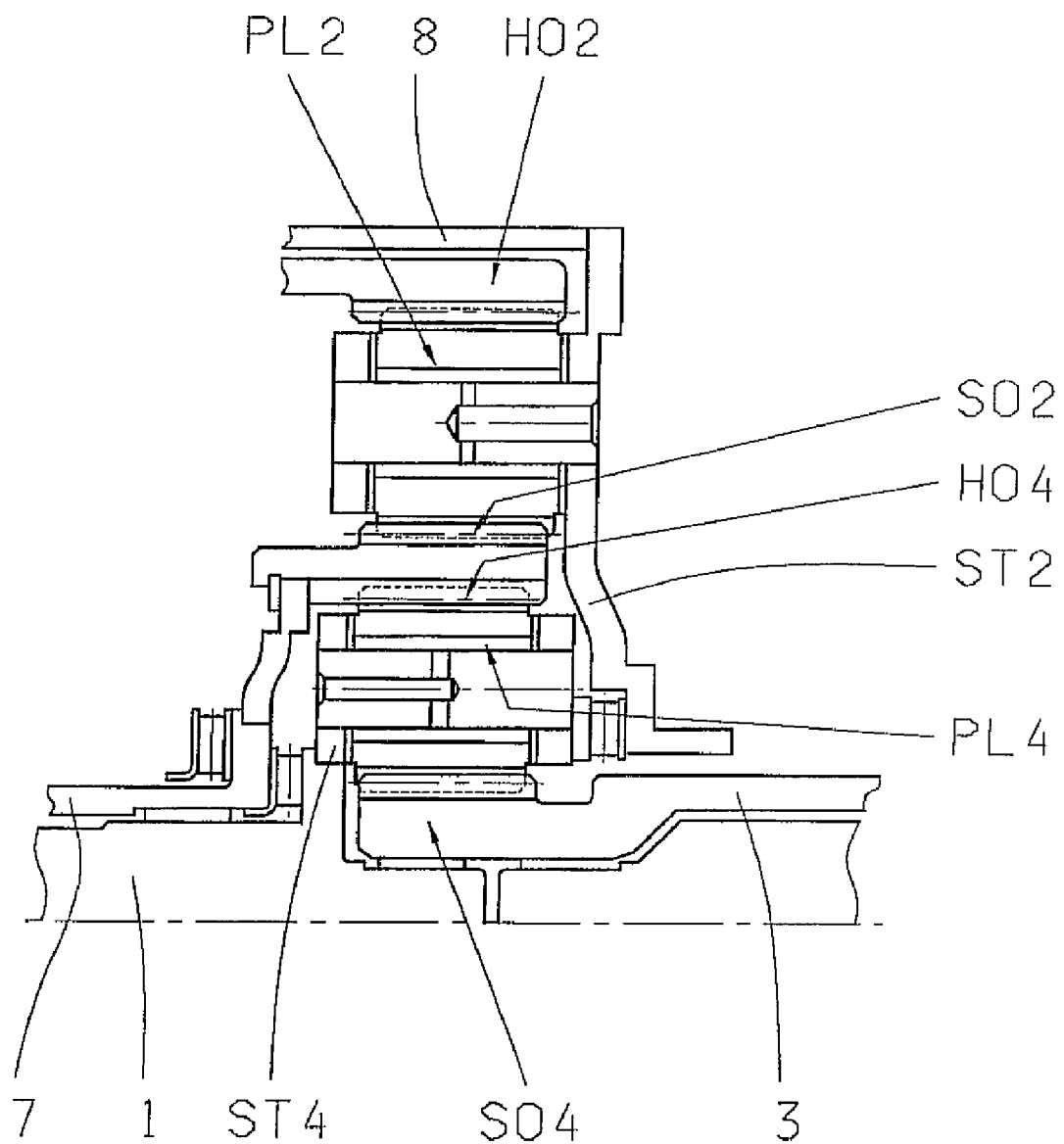
FIG. 11 is a exemplary detailed design drawing.

FIG. 11 depicts an exemplary, detailed design, concerning the gearset group formed by the second and fourth planetary gearsets RS2, RS4. As had been previously described, these two planetary gearsets RS2, RS4, in accordance with the invention, are radially intermeshing together, with the fourth planetary gearset RS4 placed at least centrally within the second planetary gearset RS2, where the sun gear SO2 of the radially outer planetary gearset RS2 is connected to the ring gear HO4 of the radial inner planetary gearset RS4. In the presented detailed drawing of FIG. 10, this sun gear SO2 and this internal gear HO4 are made as one piece. In this way, it is possible for the gearset group to fit into a radially disposed construction space, which has been reduced to a minimum.

In another advantageous arrangement of the sun gear SO2 and the ring gear HO4, now differing from FIG. 10, it is possible, for example based on acoustic grounds, that the sun gear SO2 and the ring gear HO4 are made as separate components and are accordingly coupled together, where this coupling is rigidly rotationally fixed or even made rotationally elastic to a predetermined extent. In this way, for the acoustic decoupling, for example, interposed elastomers can be placed radially between the sun gear SO2 and the ring gear HO4.

Obviously, the component arrangement variations, shown in the FIGS. 9 and 10, are not limited to the use of the described gearset concept as shown in FIG. 1. The expert can, upon need, after the inventive concepts of these variations without additional inventive efforts advantageously to other corresponding gearset concepts within the framework of the invention as these for example presented in the FIGS. 2 to 6.

For all the above presented, i.e., described embodiments of the transmission family, the following statements are valid.

According to the invention, it is possible even with identical transmission designs, that due to the characteristics of stationary transmission ratios of the individual planetary gearsets, different gear ratios can indeed exist, so that specifications for applications or an operation are beset with variations.

Figure 16:
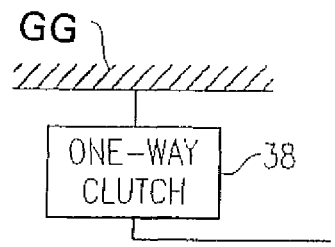
FIG. 16 is a diagrammatic view of an embodiment of the inventive multi-speed transmission having a one-way clutch.

It is additionally possible, as shown in FIG. 16, that on each appropriate position of the multi-speed, automatic transmission, additional one-way clutch 38 can be provided, for instance, between one shaft and the housing or in order to connect together two shafts.

Figure 12:
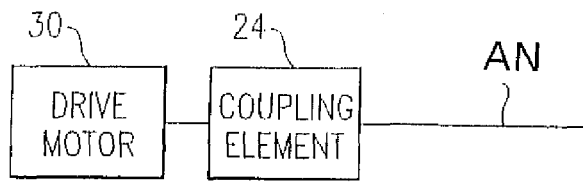
FIG. 12 is a diagrammatic view of an embodiment of the inventive multi-speed transmission with a coupling element and a drive motor.
Figure 13:
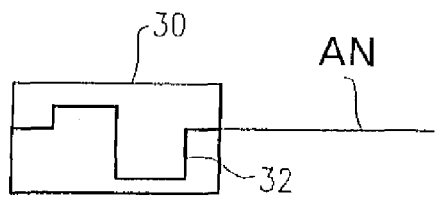
FIG. 13 is a diagrammatic view of an embodiment of the inventive multi-speed transmission with a crankshaft of the drive motor fixed to an input shaft of the multi-speed transmission.
Figure 14:
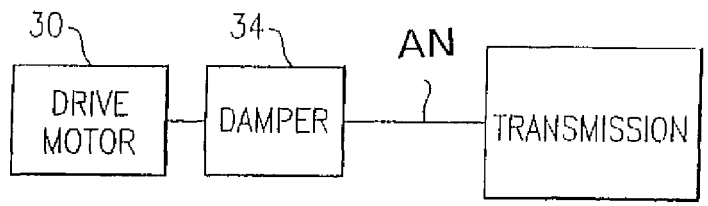
FIG. 14 is a diagrammatic view of an embodiment of the inventive multi-speed transmission having the drive motor communicating with a damper.
Figure 20:
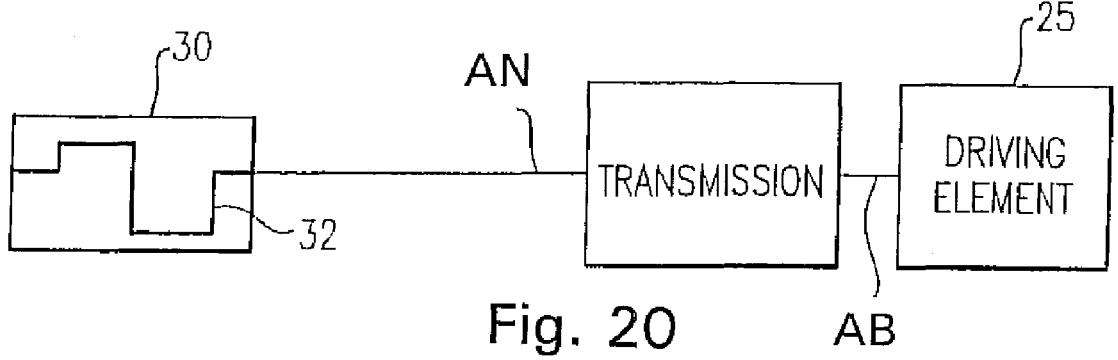
FIG. 20 is a diagrammatic view of another embodiment of the inventive multi-speed transmission with the crankshaft of the drive motor fixed to the input shaft of the multi-speed transmission and the coupling element located behind the multi-speed transmission.

Within the limits of an advantageous development as shown in FIG. 12, upon need, it is possible that the input shaft AN can be separated from a drive motor 30, by way of a coupling element 24, with the coupling element being a hydrodynamic converter, a hydraulic clutch, a dry startup clutch, a wet startup clutch, a magnetic powder actuated clutch or a centrifugal clutch, can be used as the means of separation. It is also possible as shown in FIG. 20, to place a driving element 25 of one of these cited types in the power flow behind the transmission where, in such a case as shown in FIG. 13, the input shaft AN can be directly connected to the crankshaft 32 of the drive motor 30. The inventive multi-speed, automatic transmission, as shown in FIG. 14, allows the placement of a torsion vibratory damper 34 between the drive motor 30 and the transmission.

Figure 15:
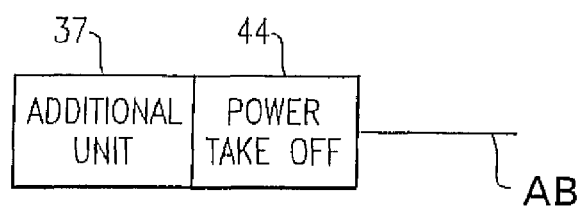
FIG. 15 is a diagrammatic view of an embodiment of the inventive multi-speed transmission with a power take-off for driving an additional unit.
Figure 18:
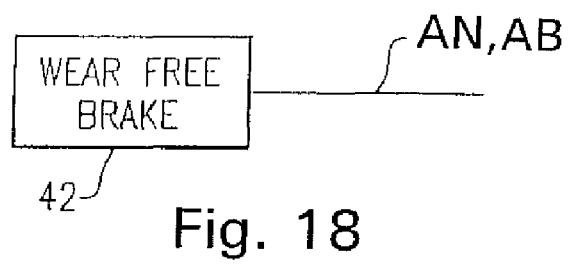
FIG. 18 is a diagrammatic view of a preferred design of the inventive multi-speed transmission having a wear free brake.
Figure 19:
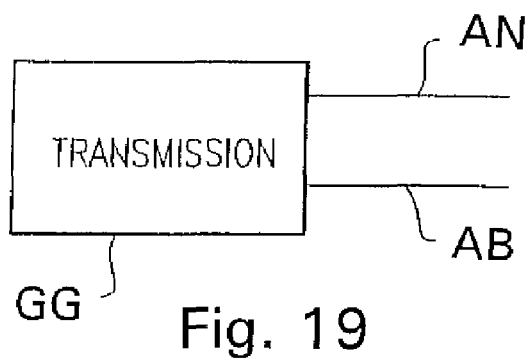
FIG. 19 is a diagrammatic view of a further embodiment of the invention with the input and the output being provided on the same side of the multi-speed transmission housing.

Within the framework of an additional, example of the invention shown in FIG. 18, it is possible that on each shaft, preferably on the input shaft AN or on the output shaft AB to place a wear free brake 42, such as a hydraulic or electric retarder or the like, which especially is of particular value in the case of commercial vehicles. Further, as shown in FIG. 15, for providing drive for additional units 37 on each shaft, preferably on the input shaft AN and on the output shaft AB, a power take off 44 can be installed. Additionally, as shown in FIG. 19, the input and the output are provided on the same side of the housing GG.

The here applied shifting elements can be used as load switching clutches or brakes. Especially it is possible that clutches or brakes of force-fit types, such as disk clutches, band brakes and/or conical clutches, can be used. Further it is possible to employ shape fit brakes and/or clutches, such as synchronizing or grab clutches as shifting elements. In particular, in an application of a band brake as brake B, the transmission length could be reduced. Also, in accord with the shifting logic of the transmission, brake B is well suited because it is engaged in the reverse gear as well as the first five forward gears.

Figure 17:
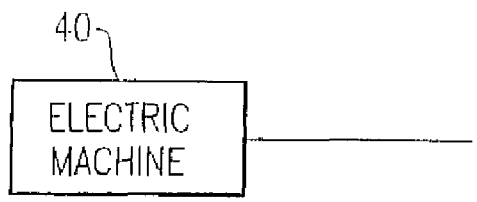
FIG. 17 is a diagrammatic view of an embodiment of the inventive multi-speed transmission with an electric machine.

An additional advantage of the multi-speed, automatic transmission here presented in FIG. 17, can be found in that to each shaft, an electrical machine 40 is additionally employed as a generator and/or as an auxiliary drive machine.

Obviously, each design concept brought into reality, especially each spatial arrangement of the planetary gearsets and the shifting elements themselves, for themselves alone or in relation to one another, and insofar as being technically advantageous, fall under the protection umbrella of the present invention, with or without a transmission-function, as elements of design are disclosed in the claims, even when such improved concepts are not explicitly presented in the hereto appended Figures or in the description.

REFERENCE NUMERALS

1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing of transmission
GW housing wall of transmission
ABTR output stage, spur gear, chain connection
DIFF differential
RS1 first planetary gearset
HO1 internal gear of first planetary gearset
SO1 sun gear of first planetary gearset
ST1 carrier of first planetary gearset
PL1 planet gears of the first planetary gearset
RS2 second planetary gearset
HO2 internal gear of the second planetary gearset
SO2 sun gear of the second planetary gearset
ST2 carrier of the second planetary gearset
PL2 planet gears of the second planetary gearset
RS3 third planetary gearset
HO3 internal gear of the third planetary gearset
SO3 sun gear of the third planetary gearset
ST3 carrier of the third planetary gearset
PL3 planet gears of the third planetary gearset
RS4 fourth planetary gearset
HO4 internal gear of the fourth planetary gearset
SO4 sun gear of the fourth planetary gearset
ST4 carrier of the fourth planetary gearset
PL4 planet gears of the fourth planetary gearset
i gear ratio
φ spring, between gear steps

The invention claimed is:

1. A multi-speed transmission of planetary construction for a motor vehicle, the transmission comprising:
   an input shaft (AN) and an output shaft (AB);
   first, second, third and fourth planetary gearsets (RS1, RS2, RS3, RS4), at least first, second, third, fourth, fifth, sixth, seventh and eighth rotatable shafts (1, 2, 3, 4, 5, 6, 7, 8) as well as first, second, third, fourth and fifth shifting elements (A, B, C, D, E), whose selective engagement achieves various rotational speed ratios between the input and output shafts (AN, AB) so that eight forward speeds and at least one reverse speed can be achieved, whereby:

a carrier (ST4) of the fourth planetary gearset (RS4) and the input shaft (AN) are rotationally affixed to one another and form the first shaft (1);

a carrier (ST3) of the third planetary gearset (RS3) and the output shaft (AB) are rotationally affixed to one another and form the second shaft (2);

a sun gear (SO1) of the first planetary gearset (RS1) and a sun gear (SO4) of the fourth planetary gearset (RS4) are rationally connected to one another and form the third shaft (3);

a ring gear (HO1) of the first planetary gearset (RS1) forms the fourth shaft (4);

a ring gear (HO2) of the second planetary gear (RS2) and a sun gear (SO3) of the third planetary gearset (RS3) are rotationally connected to one another and form the fifth shaft (5);

a carrier (ST1) of the first planetary gearset (RS1) and a ring gear (HO3) of the third planetary gearset (RS3) are rotationally affixed to one another and form the sixth shaft (6);

a sun gear (SO2) of the second planetary gearset (RS2) and a ring gear (HO4) of the fourth planetary gearset (RS4) are rotationally affixed to one another and form the seventh shaft (7);

a carrier (ST2) of the second planetary gearset (RS2) forms the eighth shaft (8);

the first shifting element (A) is located between the third shaft (3) and a housing (GG) of the transmission;

the second shifting element (B) is located between the fourth shaft (4) and the housing (GG) of the transmission;

the third shifting element (C) is located, in a power flow, between the fifth shaft (5) and the first shaft (1);

the fourth shifting element (D) is located, in the power flow, either between the eighth shaft (8) and the second shaft (2) or between the eighth shaft (8) and the sixth shaft (6); and the fifth shifting element (E) is located, in the power flow, either between the seventh shaft (7) and the fifth shaft (5), or between the seventh shaft (7) and the eighth shaft (8) or between the fifth shaft (5) and the eighth shaft (8), wherein the second and the fourth planetary gearsets (RS2, RS4), when viewed in an axial direction, are located in a plane one radially above the other;

the fourth planetary gearset (RS4) is located centrally within the second planetary gearset (RS2), and the second and the fourth planetary gearsets (RS2, RS4), when observed spatially, are located in an area axially between the first and the third planetary gearsets (RS1, RS3).

2. The multi-speed transmission according to claim 1, wherein the ring gear (HO4) of the fourth planetary gearset (RS4) forms, simultaneously, the sun gear (SO2) of the second planetary gearset (RS2), whereby the ring gear (HO4) of the fourth planetary gearset (RS4) and the sun gear (SO2) of the second planetary gearset (RS2) are combined as a one-piece structure.

3. The multi-speed transmission according to claim 1, wherein the ring gear (HO4) of the fourth planetary gearset (RS4) and the sun gear (SO2) of the second planetary gearset (RS2) are fabricated as separate components which are subsequently connected with one another.

4. The multi-speed transmission according to claim 3, wherein the ring gear (HO4) of the fourth planetary gearset (RS4) and the sun gear (SO2) of the second planetary gearset (RS2) are rotationally affixed to one another.

5. The multi-speed transmission according to claim 3, wherein the ring gear (HO4) of the fourth planetary gearset (RS4) and the sun gear (SO2) of the second planetary gearset (RS2) are rotation-elastically connected to one another.

6. The multi-speed transmission according to claim 1, wherein the carrier (ST4) of the fourth planetary gearset (RS4) is located about the input shaft (AN), that is, above the first shaft (1) of the transmission and is radially connected to the transmission housing (GG), that is, located on a hub, affixed to the transmission housing or is placed to be radially deposed in the third shaft (3) of the transmission.

7. The multi-speed transmission according to claim 1, wherein the carrier (ST2) of the second planetary gearset (RS2) is located radially on the third shaft (3) of the transmission.

8. The multi-speed transmission according to claim 1, wherein the following gear speeds are caused by the following shifting operations:

a first forward gear speed is achieved by engagement of the first, the second and the third shifting elements, (A, B, C);

second forward gear speed is achieved by engagement of the first, the second and the fifth shifting elements (A, B, E);

a third forward gear speed is achieved by engagement of the second, the third, and the fifth shifting elements (B, C, E);

a fourth forward gear speed is achieved by engagement of the second, the fourth and the fifth shifting elements (B, D, E);

a fifth forward gear speed is achieved by engagement of the second, the third and the fourth shifting elements (B, C, D);

a sixth forward gear speed is achieved by engagement of the third, the fourth and the fifth shifting elements (C, D, E);

a seventh forward gear speed is achieved by engagement of the first, the third and the fourth shifting elements (A, C, D), and an eighth forward gear speed is achieved by engagement of the first, the fourth and the fifth shifting elements (A, D, E).

9. The multi-speed transmission according to claim 1, wherein a reverse gear speed is achieved by engagement of the first, the second and the fourth shifting elements (A, B, D).

10. The multi-speed transmission according to claim 1, wherein the first, the second, the third and the fourth planetary gearsets (RS1, RS2, RS3, RS4) are all negative planetary gearsets.

11. The multi-speed transmission according to claim 1, wherein the first, the third and the fourth planetary gearsets (RS1, RS3, RS4) are driven by only one shaft of the transmission, whereby each gearsets is centrally passed through in the axial direction.

12. The multi-speed transmission according to claim 1, wherein the input shaft (AN) and the output shaft (AB) are not co-axially arranged to one another, but are located one of axis-parallel and angularly disposed with respect to one another.

13. The multi-speed transmission according to claim 11, wherein the input shaft (AN), which is the first shaft (1) of the transmission, centrally and axially penetrates the third planetary gearset (RS3).

14. The multi-speed transmission according to claim 1, wherein the input shaft (AN) and the output shaft (AB) are co-axially aligned to one another.

15. The multi-speed transmission according to claim 1, wherein the first and the second shifting element (A, B), spatially observed, are located adjacent the first planetary gearset (RS1).

16. The multi-speed transmission according to claim 1, wherein the second shifting element (B), spatially observed, is located at least partially, radially above the first planetary gearset (RS1).

17. The multi-speed transmission according to claim 1, wherein the first shifting element (A), spatially observed, is located on a side of the first planetary gearset (RS1) which lies opposite both the second and the fourth planetary gearsets (RS2, RS4).

18. The multi-speed transmission according to claim 1, wherein a disk set of the first shifting element (A) has a smaller diameter than is a disk set of the second shifting element (B).

19. The multi-speed transmission according to claim 1, wherein the third and the fifth shifting element (C, E), spatially observed, are axially located between the third planetary gearset (RS3) and the second and the fourth planetary gearsets (RS2, RS4).

20. The multi-speed transmission according to claim 1, wherein the third and the fifth shifting element (C, E), when considered radially, are essentially located about the other, whereby a disk set of the fifth shifting element (E) has a greater diameter than a disk set of the third shifting element (C).

21. The multi-speed transmission according to claim 1, wherein the third and the fifth shifting elements (C, E), spatially observed, are placed essentially axially beside one another.

22. The multi-speed transmission according to claim 1, wherein the third shifting element (C), spatially observed, is located on a side of the third planetary gearset (RS3) remote from both the second and the fourth planetary gearsets (RS2, RS4).

23. The multi-speed transmission according to claim 22, wherein the transmission possesses a spur or chain driven output staging (ABTR), which is located in the power flow between the carrier (ST3) of the third planetary gearset (RS3) and the output shaft (AB), the spur or chain driven output staging (ABTR) is connected to the carrier (ST3) of the third planetary gearset (RS3) and is located axially between the third shifting element (C) and the third planetary gearset (RS3).

24. The multi-speed transmission according to claim 23, wherein the spur or chain driven output staging (ABTR), which is connected to the carrier (ST3) of the third planetary gearset (RS3), is rotationally secured to a wall (GW) affixed to the transmission housing, which wall is axially located between the third shifting element (C) and the spur or chain driven output staging (ABTR) which, in turn, is connected with the carrier (ST3) of the third planetary gearset (RS3).

25. The multi-speed transmission according to claim 1, wherein a disk set of the fourth shifting element (D), spatially considered, is located axially between the third planetary gearset (RS3) and both the second and the fourth planetary gearsets (RS2, RS4).

26. The multi-speed transmission according to claim 1, wherein a disk set of the fourth shifting element (D), spatially observed, is located axially between the first planetary gearset (RS1) and the second and the fourth planetary gearsets (RS2, RS4).

27. The multi-speed transmission according to claim 1, wherein a disk set of the fourth shifting element (D), spatially observed, is located at least partially radially about the second planetary gearset (RS2).

28. The multi-speed transmission according to claim 1, wherein the disk set of the fourth shifting element (D), observed spatially, is located at least partially radially about a disk set of the third shifting element (C).

29. The multi-speed transmission according to claim 1, wherein the disk sets of the fourth and the fifth shifting elements (D, E), observed spatially, are essentially located adjacent one another.

30. The multi-speed transmission according to claim 1, wherein the disk set of the fourth shifting element (D), observed spatially, is located at least partially and radially about a disk set of the fifth shifting element (E).

31. The multi-speed transmission according to claim 1, wherein
the first shaft (1) runs sectionally, centrally disposed within the fifth shaft (5) and sectionally, centrally disposed within the seventh shaft (7);
the fifth shaft (5) runs sectionally, centrally disposed within the eighth shaft (8);
the eighth shaft (8) runs centrally disposed within the sixth shaft (6);
the fifth shaft (5) completely bypasses, in axial and radial directions, the third and the fourth shifting elements (C, E); and
the sixth shaft (6) bypasses, in the axial and the radial directions, the second and the fourth planetary gearsets (RS2, RS4) as well as the fourth and the fifth shifting elements (D, E).

32. The multi-speed transmission according to claim 1, wherein the sixth shaft (6) completely bypasses, in axial and radial directions, the third shifting element (C).

33. The multi-speed transmission according to claim 1, wherein the eighth shaft (8) completely bypasses, in axial and radial directions, the second and the fourth planetary gearsets (RS2, RS4) as well as the fifth shifting element (E).

34. The multi-speed transmission according to claim 1, wherein the eighth shaft (8) completely bypasses, in axial and radial directions, the third shifting element (C).

35. The multi-speed transmission according to claim 1, wherein the second shaft (2) completely bypasses, in axial and radial directions, the second and the fourth planetary gearsets (RS2, RS4) as well as the third and the fifth shifting elements (C, E).

36. The multi-speed transmission according to claim 1, wherein between at least one of the input, the output, the first, the second, the third, the fourth, the fifth, the sixth, the seventh and the eighth shafts (AN, AB, 1, 2, 3, 4, 5, 6, 7, 8) and the housing (GG) of the transmission, a free wheel is installed.

37. The multi-speed transmission according to claim 1, wherein the input shaft (AN) of the transmission is located on a side of the transmission housing (GG) which is opposite to the first planetary gearset (RS1).

38. The multi-speed transmission according to claim 1, wherein the input shaft (AN) of the transmission is located on that side of the transmission housing (GG) which is opposite to the third planetary gearset (RS3).

39. The multi-speed transmission according to claim 1, wherein a clutch element separates the input shaft (AN) from a drive motor of the motor vehicle.

40. The multi-speed transmission according to claim 1, wherein an external startup element is installed behind the transmission, in a direction of power flow, whereby the input shaft (AN) is rotationally affixed to or is turnably-elastically connected to a crankshaft of a drive motor.

41. The multi-speed transmission according to claim 39, wherein the clutch element is one of a hydrodynamic converter, a hydraulic clutch, a dry startup clutch, a wet startup clutch, a magnetic powder clutch and a centrifugally actuated clutch.

42. The multi-speed transmission according to claim 1, wherein starting of the motor vehicle occurs by a shifting element located internally within the transmission and the input shaft (AN) is continually rotationally affixed to or rotatably elastically connected with a crankshaft of a drive motor.

43. The multi-speed transmission according to claim 42, wherein starting of the motor vehicle, in both forward and reverse directions of travel, occurs by way of the same transmission shifting elements.

44. The multi-speed transmission according to claim 1, wherein a torsional-vibration damper is located between a drive motor and the transmission.

45. The multi-speed transmission according to claim 1, wherein at least one of:
   a wear-resistant brake,
   an auxiliary output shaft, for driving an additional aggregate, and
   an electrical machine available as either a generator or as a machine, for providing auxiliary power,
   is provided on at least one of the input, the output, the first, the second, the third, the fourth, the fifth, the sixth, the seventh and the eighth shafts (AN, AB, 1, 2, 3, 4, 5, 6, 7, 8) of the transmission.

46. The multi-speed transmission according to claim 41, wherein, the first, the second, the third, the fourth and the fifth shifting elements (A, B, C, D, E) are each one of friction based clutches, friction based brakes, disk clutches, band brakes, cone clutches, lock-up clutches, lock-up brakes, cone clutches and claw clutches.

* * * * *